US012636835B2

(12) United States Patent (10) Patent No.: US 12,636,835 B2
Li et al. (45) Date of Patent: May 26, 2026

(54) SYSTEMS AND METHODS FOR GENERATING DIRECTLY MANUFACTURABLE DENTAL APPLIANCES

(71) Applicant: Align Technology, Inc., San Jose, CA (US)

(72) Inventors: Chunhua Li, Cupertino, CA (US); Bastien Pesenti, San Jose, CA (US); Roman A. Roschin, Moscow (RU); Jun Sato, San Jose, CA (US); Yuxiang Wang, Newark, CA (US)

(73) Assignee: Align Technology, Inc., San Jose, CA (US)

( * ) Notice: Subject to any disclaimer, the term of this patent is extended or adjusted under 35 U.S.C. 154(b) by 369 days.

(21) Appl. No.: 18/490,649

(22) Filed: Oct. 19, 2023

(65) Prior Publication Data

US 2024/0131795 A1 Apr. 25, 2024
US 2024/0227301 A9 Jul. 11, 2024

Related U.S. Application Data

(60) Provisional application No. 63/482,381, filed on Jan. 31, 2023, provisional application No. 63/380,345, filed on Oct. 20, 2022.

(51) Int. Cl.
*B29C 64/00* (2017.01)
*A61C 7/00* (2006.01)
(Continued)

(52) U.S. Cl.
CPC ............ *B29C 64/386* (2017.08); *A61C 7/002* (2013.01); *A61C 7/08* (2013.01); *B33Y 10/00* (2014.12);
(Continued)

(58) Field of Classification Search
CPC ......... B29C 64/386; A61C 7/002; A61C 7/08; B33Y 10/00; B33Y 30/00; B33Y 50/02; B33Y 80/00; B29L 2031/7532
See application file for complete search history.

(56) References Cited

U.S. PATENT DOCUMENTS 6,210,162 B1 4/2001 Chishti et al.
6,309,215 B1 10/2001 Phan et al.
(Continued)

FOREIGN PATENT DOCUMENTS

WO 2015075094 A1 5/2015
WO 2016078838 A1 5/2016
(Continued)

OTHER PUBLICATIONS

Maestro 3D, "Dental Studio", https://www.maestro3d.com/dental.studio.aspx, 28 pages.
(Continued)

*Primary Examiner* — Aleksey Olshannikov
(74) *Attorney, Agent, or Firm* — FORTEM IP LLP

(57) ABSTRACT

Systems, methods, and devices for computer-aided design, digital treatment planning, and direct additive manufacturing of dental appliances are provided. In some embodiments, a method includes receiving a treatment plan for a patient's teeth, the treatment plan specifying a target arrangement for the teeth and a plurality of treatment stages to reposition the teeth from an initial arrangement toward the target arrangement. The method can include identifying appliance design parameters for one or more dental appliances to implement at least one treatment stage of the plurality of treatment stages. The appliance design parameters can include one or more manufacturability parameters corresponding to an additive manufacturing process to be used to directly fabricate the one or more dental appliances. The method can further include determining an appliance geometry for the (Continued)

one or more dental appliances using the set of appliance design parameters.

23 Claims, 14 Drawing Sheets

(51) Int. Cl.

| | |
|---|---|
| *A61C 7/08* | (2006.01) |
| *B29C 64/386* | (2017.01) |
| *B33Y 10/00* | (2015.01) |
| *B33Y 30/00* | (2015.01) |
| *B33Y 50/02* | (2015.01) |
| *B29L 31/00* | (2006.01) |

(52) U.S. Cl.
CPC .............. *B33Y 30/00* (2014.12); *B33Y 50/02* (2014.12); *B29L 2031/7532* (2013.01)

(56) References Cited

U.S. PATENT DOCUMENTS

| | | | |
|---|---|---|---|
| 6,450,807 | B1 | 9/2002 | Chishti et al. |
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,700,385 | B2 | 7/2017 | Webber |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,162,264 | B2 | 12/2018 | McLeod et al. |
| 10,336,102 | B2 | 7/2019 | Cole |
| 10,495,973 | B2 | 12/2019 | Cole |
| 10,537,406 | B2 | 1/2020 | Wu et al. |
| 10,783,629 | B2 | 9/2020 | Parpara et al. |
| 10,888,395 | B2 | 1/2021 | Kopelman |
| 10,993,783 | B2 | 5/2021 | Wu et al. |
| 11,045,283 | B2 | 6/2021 | Riley et al. |
| 11,103,330 | B2 | 8/2021 | Webber et al. |
| 11,189,021 | B2 | 11/2021 | Shah et al. |
| 11,273,011 | B2 | 3/2022 | Shanjani et al. |
| 11,295,444 | B2 | 4/2022 | Cherkas et al. |
| 11,318,667 | B2 | 5/2022 | Mojdeh et al. |
| 11,370,173 | B2 | 6/2022 | Kelly et al. |
| 11,420,362 | B2 | 8/2022 | Mojdeh et al. |
| 11,511,485 | B2 | 11/2022 | Mojdeh et al. |
| 11,534,277 | B2 | 12/2022 | Chavez et al. |
| 11,554,000 | B2 | 1/2023 | Webber |
| 11,564,777 | B2 | 1/2023 | Kopelman et al. |
| 11,596,502 | B2 | 3/2023 | Webber et al. |
| 11,602,413 | B2 | 3/2023 | Chen et al. |
| 11,666,415 | B2 | 6/2023 | Wang et al. |
| 11,793,606 | B2 | 10/2023 | Cam et al. |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Zhenhuan et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2013/0122448 | A1 | 5/2013 | Kitching |
| 2014/0061974 | A1 | 3/2014 | Tyler |
| 2014/0265034 | A1 | 9/2014 | Dudley |
| 2015/0097316 | A1 | 4/2015 | DeSimone et al. |
| 2019/0046297 | A1 | 2/2019 | Kopelman et al. |
| 2019/0298494 | A1 | 10/2019 | Webber et al. |
| 2020/0214598 | A1* | 7/2020 | Li .......................... G01B 7/22 |
| 2020/0214801 | A1 | 7/2020 | Wang et al. |
| 2020/0290262 | A1 | 9/2020 | Aguilar Mendez et al. |
| 2021/0030516 | A1 | 2/2021 | O'Leary et al. |
| 2021/0146619 | A1 | 5/2021 | Shusteff et al. |
| 2021/0259809 | A1 | 8/2021 | O'Leary et al. |
| 2022/0061958 | A1 | 3/2022 | Savard |
| 2022/0104920 | A1 | 4/2022 | Wang et al. |
| 2022/0183795 | A1 | 6/2022 | Webber et al. |
| 2022/0227051 | A1 | 7/2022 | Regehly |

FOREIGN PATENT DOCUMENTS

| | | |
|---|---|---|
| WO | 2017115076 A1 | 7/2017 |
| WO | 2018032022 A1 | 2/2018 |
| WO | 2020070639 A1 | 4/2020 |
| WO | 2020245456 A1 | 12/2020 |
| WO | 2021087061 A2 | 5/2021 |
| WO | 2021130657 A1 | 7/2021 |
| WO | 2021130661 A1 | 7/2021 |
| WO | 2022011456 A1 | 1/2022 |

OTHER PUBLICATIONS

Hada, Tamaki et al., "Effect of Printing Direction on the Accuracy of 3D-Printed Dentures Using Stereolithography Technology", Materials, 2020, 13, 3405, 12 pages.

Tartaglia, Gianluca M. et al., "Direct 3D Printing of Clear Orthodontic Aligners: Current State and Future Possibilities", Materials, 2021, 14, 1799, 11 pages.

* cited by examiner

200

300a

302
Receive a treatment plan for a patient's dentition

304
Identify appliance design parameters for an appliance of the treatment plan

306
Determine an appliance geometry using the appliance design parameters

308
Generate instructions for direct fabrication of the appliance

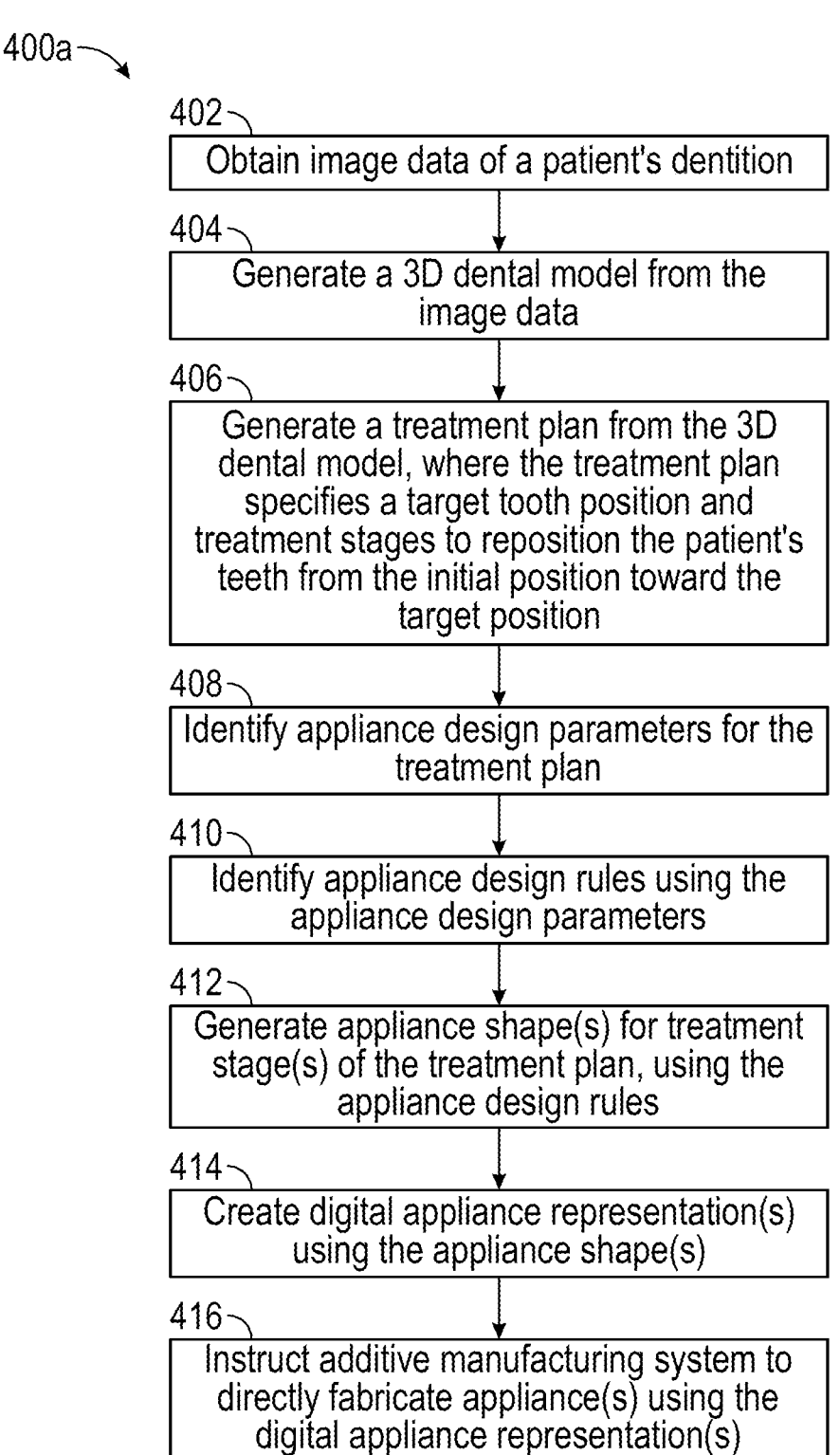

400a

402
Obtain image data of a patient's dentition

404
Generate a 3D dental model from the image data

406
Generate a treatment plan from the 3D dental model, where the treatment plan specifies a target tooth position and treatment stages to reposition the patient's teeth from the initial position toward the target position 408
Identify appliance design parameters for the treatment plan 410
Identify appliance design rules using the appliance design parameters 412
Generate appliance shape(s) for treatment stage(s) of the treatment plan, using the appliance design rules 414
Create digital appliance representation(s) using the appliance shape(s)

416
Instruct additive manufacturing system to directly fabricate appliance(s) using the digital appliance representation(s)

Figures 7C, 8, 9:
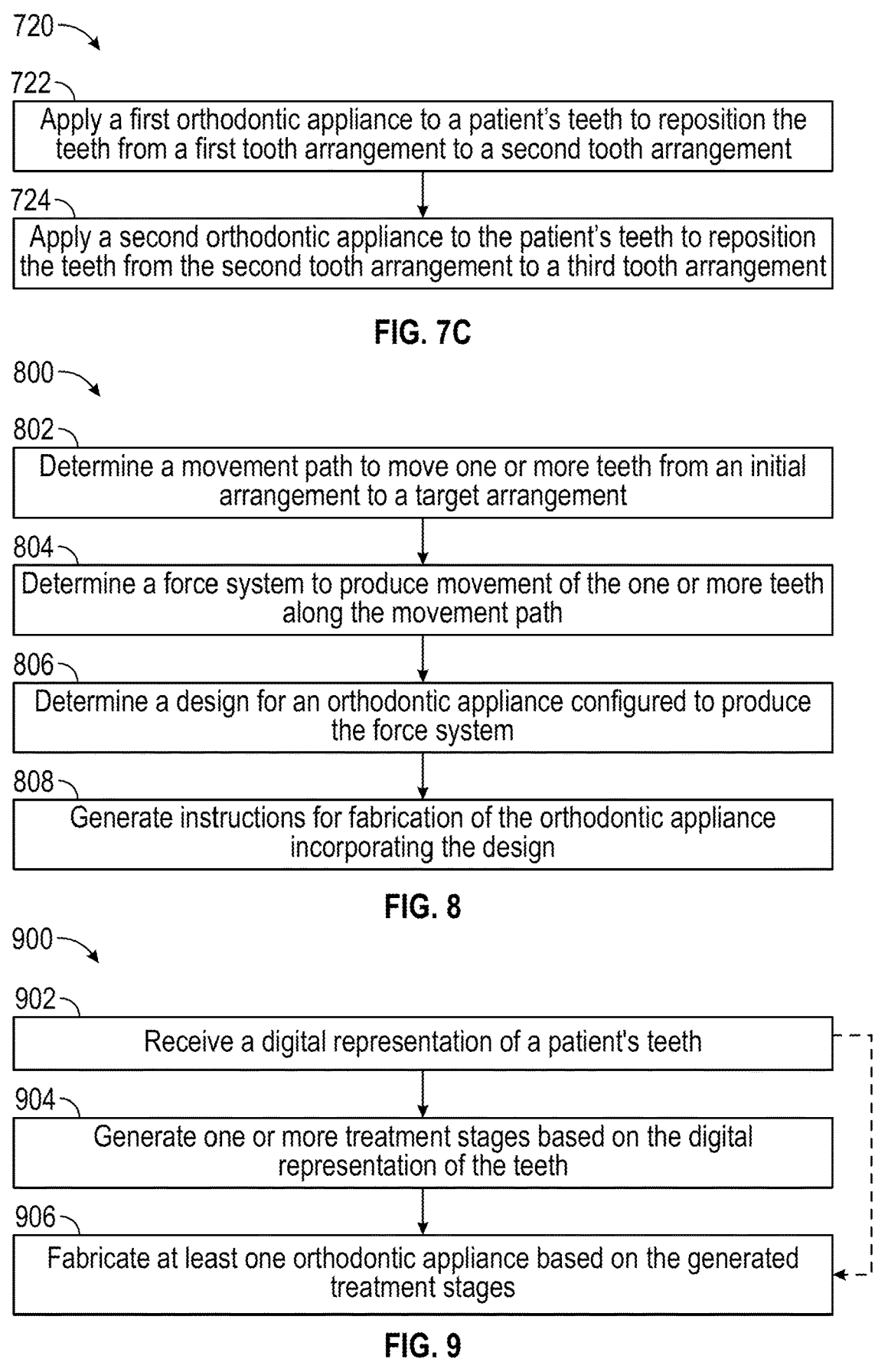

722
| Apply a first orthodontic appliance to a patient's teeth to reposition the teeth from a first tooth arrangement to a second tooth arrangement |

724
| Apply a second orthodontic appliance to the patient's teeth to reposition the teeth from the second tooth arrangement to a third tooth arrangement |

802
| Determine a movement path to move one or more teeth from an initial arrangement to a target arrangement |

804
| Determine a force system to produce movement of the one or more teeth along the movement path |

806
| Determine a design for an orthodontic appliance configured to produce the force system |

808
| Generate instructions for fabrication of the orthodontic appliance incorporating the design |

902
| Receive a digital representation of a patient's teeth |

904
| Generate one or more treatment stages based on the digital representation of the teeth |

906
| Fabricate at least one orthodontic appliance based on the generated treatment stages |

1002 Receive patient/treatment information

1004 Case assessment

1006 Generate treatment plan

1008 Customized treatment guidelines

1010 Administer appliances

1012 Progress tracking

1014 Next phase/finalize

SYSTEMS AND METHODS FOR GENERATING DIRECTLY MANUFACTURABLE DENTAL APPLIANCES

CROSS-REFERENCE TO RELATED APPLICATION(S)

The present application claims the benefit of priority to U.S. Provisional Application No. 63/380,345, filed Oct. 20, 2022, and U.S. Provisional Application No. 63/482,381, filed Jan. 31, 2023, the disclosures of which are incorporated by reference herein in their entirety.

TECHNICAL FIELD

The present technology generally relates to manufacturing, and in particular, to systems and methods for generating directly manufacturable dental appliances.

BACKGROUND

Dental appliances are used to treat various dental conditions, such as dental malocclusions, jaw dysfunction/misalignment, functional and/or aesthetic conditions, endodontic conditions, and others. Example appliances used in the treatment of orthodontic conditions include bracket and wire braces, aligners, retainers, attachment placement devices, conventional and/or incremental palatal expanders, prosthetics (e.g., bridges, crowns, implants), surgical and/or gum shaping appliances, etc. Conventionally, processes for manufacturing many types of dental appliances (e.g., aligners and retainers) involve additively manufacturing one or more molds representative of a person's dentition at various stages of treatment, then thermoforming a plastic sheet over the mold to create dental appliances. While attachment placement devices, incremental palatal expanders, limited stage aligners, and some other types of dental appliances have been directly additively manufactured, these manufacturing processes have not been scaled to industrial feasibility.

Issues with conventional processes for manufacturing many dental appliances include waste of additively manufactured mold materials (which are often disposed or burned as fuel), difficulty with implementing predictable treatments, and difficulty with implementing features that treat complex dental conditions. Additionally, conventional processes for manufacturing many dental appliances do not allow an appliance designer to visualize a completed appliance in a manner they can use to plan treatments. For instance, conventional dental appliance design software may allow a designer to visualize the tooth stages used to form molds, but do not allow the designer to effectively visualize a series of completed aligners, incremental palatal expanders, or other appliances that would implement a treatment plan. Conventional dental appliance design software also does not allow the designer to effectively use aspects of appliance design to iterate and/or plan treatments. For these and other reasons, the systems, methods, and computer-readable media presented herein are discussed.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIG. 4A is a flow diagram illustrating a method for treatment planning and appliance design, in accordance with embodiments of the present technology.

FIG. 7C illustrates a method of orthodontic treatment using a plurality of appliances, in accordance with embodiments of the present technology.

FIG. 8 illustrates a method for designing an orthodontic appliance, in accordance with embodiments of the present technology.

FIG. 9 illustrates a method for digitally planning an orthodontic treatment and/or design or fabrication of an appliance, in accordance with embodiments of the present technology.

DETAILED DESCRIPTION

Figure 1A:
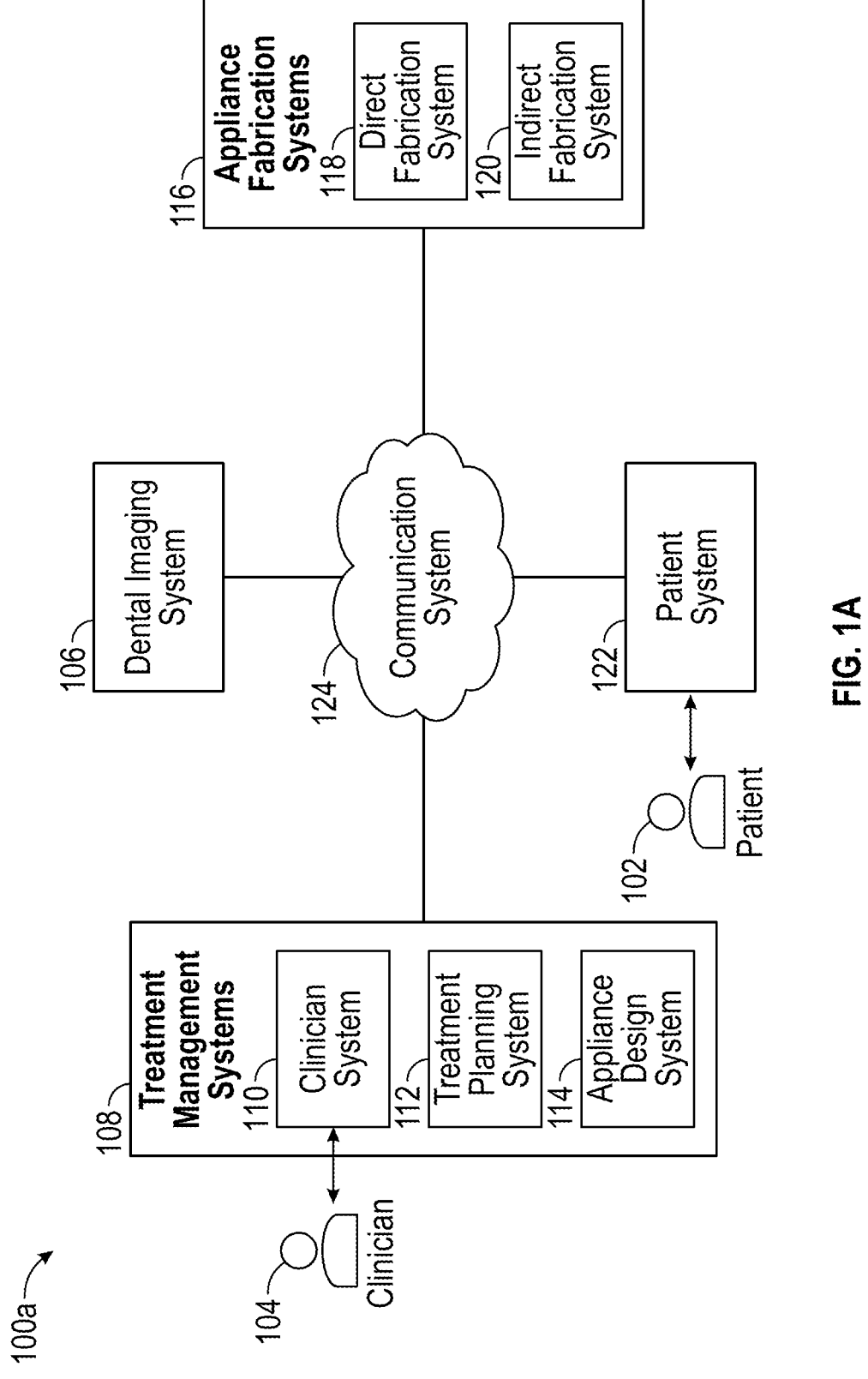
FIG. 1A is a schematic diagram illustrating a treatment planning and appliance design ecosystem, in accordance with embodiments of the present technology.

The present technology relates to the design and manufacturing of dental appliances, such as aligners, palatal expanders, retainers, attachment placement devices, attachments, oral sleep apnea appliances, and mouth guards. In some embodiments, it is advantageous to manufacture dental appliances using a direct fabrication process, such as additive manufacturing. For example, direct fabrication permits manufacturing of appliances with complex geometries (e.g., cavity geometries that differ from the shape of the received tooth, control over contact points, integrated features) and/or heterogeneous properties (e.g., variable thickness, stiffness, material composition) that would be difficult or impossible to produce using indirect fabrication techniques such as thermoforming. Direct fabrication can also reduce manufacturing time and material consumption by eliminating the requirement for molds or other physical templates to form the appliance.

Direct fabrication processes may exhibit certain limitations, such as limitations on the geometry of the object (e.g., feature size, thickness, unsupported structures) and/or the properties of the object (e.g., stiffness, flexibility, stress relaxation). Direct fabrication processes may also introduce certain inaccuracies into the object geometry due to printer resolution, printer bias, overcuring, changes in the material during printing and/or post-processing, and/or other process-specific issues. Accordingly, certain appliance designs may be difficult or impossible to manufacture via direct fabrication.

To address these and/or other challenges, the present technology provides systems and methods for designing dental appliances. In some embodiments, for example, a method includes receiving a treatment plan for a patient's teeth. The method can include identifying a set of appliance design parameters for a dental appliance configured to implement the treatment plan. The set of appliance design parameters can include one or more manufacturability parameters corresponding to an additive manufacturing process to be used to directly fabricate the dental appliance. For instance, the appliance design parameters can include constraints on the appliance geometry, based on capabilities and/or limitations of the additive manufacturing process. The appliance design parameters can also include adjustments to the appliance geometry to compensate for characteristics of the additive manufacturing process. The method can further include determining an appliance geometry for the dental appliance using the set of appliance design parameters.

The present technology can provide various advantages over conventional techniques for designing and fabricating dental appliances. For example, the methods described herein can automatically design dental appliances that are feasible for manufacturing via direct fabrication, taking into consideration the capabilities, constraints, and/or conditions of the particular direct fabrication process to be used, thus improving the efficiency and accuracy of appliance manufacturing. The methods herein can also predict whether a particular appliance design is feasible for direct fabrication, thus avoiding wasted time and/or materials in attempting to manufacture appliance designs that are difficult or impossible to produce via direct fabrication. The methods herein can also determine the appropriate combination of adjustments to the appliance geometry, design parameters, and/or treatment plan to ensure manufacturability while maintaining the ability of the dental appliance to achieve satisfactory clinical outcomes. Moreover, the methods herein can identify cases where it is too difficult or impossible to produce dental appliances via direct fabrication, and can instead automatically reroute those cases for production via an alternative manufacturing workflow (e.g., thermoforming).

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," "right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Systems and Methods for Designing and Manufacturing Dental Appliances

FIG. 1A is a schematic diagram illustrating a treatment planning and appliance design ecosystem ("ecosystem 100a"), in accordance with embodiments of the present technology. The ecosystem 100a includes a plurality of interconnected hardware and software components that perform some or all of the following operations: planning and managing treatment of a patient 102, providing tools to allow a clinician 104 to submit a patient case for treatment and review treatment plans and/or appliance designs, generating digital designs of dental appliances for implementing a treatment plan, and/or fabrication of dental appliances via direct fabrication (e.g., direct additive manufacturing) or indirect fabrication (e.g., thermoforming). As shown in FIG. 1A, the ecosystem 100a can include a dental imaging system 106, at least one treatment management system 108 (e.g., including a clinician system 110, a treatment planning system 112, and/or an appliance design system 114), at least one appliance fabrication system 116 (e.g., a direct fabrication system 118 and/or an indirect fabrication system 120), a patient system 122, and/or a communication system 124.

The dental imaging system 106 is configured to obtain image data of a patient's dentition, intraoral cavity, and/or other relevant anatomical structures (e.g., craniofacial anatomy). The image data can be generated via any suitable imaging modality, and can include photographs, videos, scan data (e.g., intraoral and/or extraoral scans), magnetic resonance imaging (MRI) data, radiographic data (e.g., standard x-ray data such as bitewing x-ray data, panoramic x-ray data, cephalometric x-ray data, computed tomography (CT) data, cone-beam computed tomography (CBCT) data, fluoroscopy data), and/or motion data. The image data can include 2D data (e.g., 2D photographs or videos), 3D data (e.g., 3D photographs, intraoral and/or extraoral scans, digital models), 4D data (e.g., fluoroscopy data, dynamic articulation data, hard and/or soft tissue motion capture data), or suitable combinations thereof.

In some embodiments, for example, the dental imaging system 106 includes or is operably coupled to a scanner configured to obtain a 3D digital representation (e.g., images, surface topography data) of a patient's teeth, such as via direct intraoral scanning or indirectly via casts, impressions, models, etc. The scanner can include a probe (e.g., a handheld probe) for optically capturing 3D structures (e.g., by confocal focusing of an array of light beams). Examples of scanners include, but are not limited to, the iTero® intraoral digital scanner manufactured by Align Technology, Inc., the 3M True Definition Scanner, and the Cerec Omnicam manufactured by Sirona®.

In some embodiments, the dental imaging system 106 is configured to process the image data to generate a digital representation of the teeth of the patient 102. Alternatively, the dental imaging system 106 can transmit the image data to another component that generates the digital representation, such as the treatment planning system 112. The digital representation can be a 3D model, such as a mesh model or a surface model. Depending on the time the image data was collected, the digital representation can depict the patient's teeth in any suitable arrangement, such as an initial arrangement before the start of a treatment plan, an intermediate arrangement after treatment has commenced, or a final arrangement after the treatment has been completed.

The image data and/or digital representations of the teeth produced by the dental imaging system 106 can be used at various stages in the treatment planning and appliance design workflows described herein. For example, imaging can be performed before the start of treatment to provide the clinician 104 with an accurate depiction of the current state of the patient's teeth. The initial digital representation of the teeth can also be used as a basis for treatment planning and/or appliance design. Imaging can also be performed during the course of treatment so the clinician 104 can assess treatment progress and determine whether any modifications to the treatment plan are appropriate (e.g., whether new or modified appliances are needed). Additionally, imaging can be performed after completion of the treatment plan so the clinician 104 can assess the patient's outcome and determine whether further treatment would be beneficial (e.g., whether additional appliances are needed).

The treatment management systems 108 can include one or more systems configured to perform treatment planning and appliance design. In some embodiments, the treatment management systems 108 collectively implement an end-to-end workflow for receiving and reviewing a case for the patient 102 (e.g., an orthodontics and/or general practice case), determining a treatment prescription for the case, developing one or more treatment plans according to the treatment prescription, and/or generating designs for one or more dental appliances to implement the treatment plan(s). Additionally, the treatment management system 108 can interact with other components of the ecosystem 100a to facilitate treatment planning and appliance design. For example, the treatment management system 108 can receive image data from the dental imaging system 106, and can transmit files and/or instructions for manufacturing appliances to the appliance fabrication systems 116.

As shown in FIG. 1A, the treatment management systems 108 can include a clinician system 110 associated with the clinician 104 (e.g., an orthodontist, dentist, doctor, or other healthcare provider). The clinician system 110 can provide a software portal allowing the clinician 104 to receive and access information for a patient 102, such as image data and/or digital representations of the patient's teeth produced by the dental imaging system 106, as well as any other relevant patient data. The software portal can allow the clinician 104 to create and submit a new patient case for treatment planning using the image data, digital representations, and/or other patient data. In some embodiments, the clinician 104 can provide input specifying various treatment parameters for the patient case, such as the treatment prescription (e.g., treatment goals), tooth information (e.g., which teeth should or should not be treated, the geometry of the teeth), movement information (e.g., movement direction, movement velocity, movement types such as distalization, root control compound movement, etc.), treatment protocols for specific types of malocclusions, staging for treatment procedures such as interproximal reduction (IPR), etc. The treatment parameters can specify one or more desired appliance features, such as attachments, attachment receptacles, appliance regions that contact the teeth (e.g., contact points, pressure points, power ridges), appliance regions that avoid contact with the teeth (e.g., bubbles, virtual fillers to provide clearance at interproximal regions), activations, bite ramps, mandibular advancement wings, and/or cutlines. For example, the treatment parameters can indicate any of the following: locations and/or shapes of attachments to be mounted on the patient's teeth; locations and/or shapes of attachment receptacles formed in the appliance to engage the attachments; locations and/or shapes of tooth-contacting regions; locations and/or shapes of non-tooth-contacting regions (e.g., curvature of virtual fillers to influence appliance engagement with the teeth); direction and/or magnitude of overcorrected tooth movements for activations; locations and/or shapes of bite ramps; locations and/or shapes of mandibular advancement wings; and/or locations and/or shapes of cutlines.

The case information can be transmitted to the treatment planning system 112 and/or the appliance design system 114 to produce treatment plans and/or appliance designs for the patient case, respectively. Subsequently, the clinician system 110 can receive the treatment plans and/or recommendations produced by the treatment planning system 112, and can allow the clinician 104 to review and provide feedback (e.g., approval, comments, modifications, selection of a treatment plan). The clinician system 110 can optionally receive appliance designs produced by the appliance design system 114, and can allow the clinician 104 to review and provide feedback (e.g., approval, comments, modifications, selection of an appliance design). In some embodiments, the clinician system 110 provides a user interface allowing the clinician 104 to visualize, review, and/or provide feedback on the patient's dentition, digital representations of the teeth, treatment plan, appliance designs, and/or other data relevant to the patient's case.

The treatment planning system 112 can generate one or more treatment plans for the patient case received from the clinician system 110. The treatment plans can be manually generated by operators of the treatment planning system 112, automatically generated using real-time and/or automated software algorithms implemented by the treatment planning system 112, or suitable combinations thereof. Optionally, multiple treatment plans can be produced for a particular patient case, thus allowing the clinician 104 to compare different treatment options.

In some embodiments, the treatment planning system 112 is configured to receive image data and/or a digital representation of an initial tooth arrangement of the patient 102 from the dental imaging system 106 and/or the clinician system 110, as well as the treatment prescription from the clinician system 110. The treatment planning system 112 can use the image data and/or digital representation to determine a target tooth arrangement to achieve the treatment goals specified by the treatment prescription. The treatment planning system 112 can then generate a treatment plan for achieving the target tooth arrangement. For example, the treatment plan can include a plurality of treatment stages, such as a series of intermediate tooth arrangements configured to incrementally reposition the teeth from the initial tooth arrangement toward the target tooth arrangement. The target and intermediate tooth arrangements can be produced based on the digital representation of the initial tooth arrangement. In some embodiments, the digital representation of the initial tooth arrangement is used to produce a plurality of digital representations corresponding to the target tooth arrangement and intermediate tooth arrangements.

The treatment plan produced by the treatment planning system 112 can also incorporate other treatment parameters, such as tooth information (e.g., which teeth should or should not be treated, the geometry of the teeth), movement information (e.g., movement direction, movement velocity, movement types such as distalization, root control compound movement, etc.), desired appliance features (e.g., attachments, attachment receptacles, tooth-contacting regions, non-tooth-contacting-regions, activations, bite ramps, mandibular advancement wings, and/or cutlines), treatment protocols for specific types of malocclusions, staging for treatment procedures, constraints, modifications, etc. These parameters can be received from the clinician system 110, determined by the treatment planning system 112, or suitable combinations thereof.

In some embodiments, the treatment planning system 112 considers efficacy and/or manufacturability parameters when generating the treatment plan. The efficacy parameters can provide information that is useful for determining how to achieve the clinical goals (e.g., desired tooth positions) of a particular treatment stage and/or of the overall treatment plan. For example, the efficacy parameters can represent relationships between applied forces and tooth movements (e.g., the forces and/or force-moment ratios needed to produce a desired movement), predicted efficacy of tooth movements, overcorrections to achieve desired tooth positions, limitations on tooth movements (e.g., maximum movement amount and/or velocity, forbidden tooth movements), and/or limitations on applied forces (e.g., maximum force thresholds). The efficacy parameters can be determined based on clinical data, simulations (e.g., force simulations, finite element analysis), software algorithms (e.g., rule-based algorithms, machine learning algorithms), or suitable combinations thereof. The treatment planning system 112 can use the efficacy parameters to determine how to optimize tooth movements and/or forces applied to the teeth to achieve clinical goals for a particular treatment stage and/or overall treatment plan. The treatment planning system 112 can also the efficacy parameters to identify and avoid tooth movements and/or forces that may be difficult to achieve for clinical reasons, or are otherwise clinically contraindicated.

The manufacturability parameters can provide information regarding the direct fabrication process to be used to fabricate the dental appliances for implementing the treatment plan. For example, the manufacturability parameters can include information regarding constraints, capabilities, and/or process conditions of the direct fabrication process that may inform treatment planning. The manufacturability parameters can be determined based on experimental data, simulations (e.g., force simulations, finite element analysis), software algorithms (e.g., rule-based algorithms, machine learning algorithms), or suitable combinations thereof. The treatment planning system 112 can use the manufacturability parameters to select tooth movements that are feasible with a directly fabricated appliance, while avoiding tooth movements that may be difficult to achieve using a directly fabricated appliance. For example, certain types of tooth movements may require forces that are too high to be produced by a directly fabricated appliance; certain types of tooth movements may require appliance features that are too large or small for direct fabrication; and so on.

Once a treatment plan is generated, the treatment planning system 112 can send to the treatment plan to the clinician system 110 for review by the clinician 104. If the clinician 104 provides modifications to the treatment plan, the treatment planning system 112 can receive and review the modifications, and update the treatment plan if appropriate. The updated treatment plan can then be sent back to the clinician system 110 for further review. This process can be repeated until the treatment plan is approved by the clinician 104.

The appliance design system 114 can receive an approved treatment plan from the treatment planning system 112 and/or other relevant inputs (e.g., digital representations of teeth, treatment parameters, treatment goals, material capabilities, features, fabrication process conditions). The appliance design system 114 can design one or more appliances (e.g., aligners, palatal expanders, retainers, attachment placement devices) that implement one or more treatment stages of the treatment plan. Each appliance design can include a digital representation of the geometry of an appliance, such a 3D digital model (e.g., a surface model, mesh model, non-parametric model, parametric model). The digital representation can depict the 3D shape of the appliance, such as a thickness distribution of the appliance (e.g., a uniform or a non-uniform thickness distribution). The digital representation can also show the locations and sizes of appliance features (e.g., attachment receptacles, tooth-contacting regions, non-tooth-contacting-regions, activations, bite ramps, mandibular advancement wings, and/or cutlines). The appliance designs can be manually generated by operators of the appliance design system 114, automatically generated using real-time and/or automated software algorithms implemented by the appliance design system 114, or suitable combinations thereof. In some embodiments, multiple appliance designs are produced for one or more treatment stages so the clinician 104 can select a desired appliance design after reviewing different options.

In some embodiments, the appliance design system 114 generates the appliance designs based on a set of appliance design parameters. For example, the appliance design parameters can include one or more manufacturability parameters corresponding to a direct fabrication process (e.g., an additive manufacturing process) to be used to manufacture the appliance. Some or all of the manufacturability parameters can be the same as the manufacturability parameters used by the treatment planning system 112, or some or all of the manufacturability parameters can be different from the manufacturability parameters used by the treatment planning system 112.

The manufacturability parameters can relate to the constraints, capabilities, and/or process conditions of the direct fabrication process. For example, the manufacturability parameters can include constraints on the appliance geometry, such as a minimum feature size, a maximum feature size, a minimum appliance thickness, a maximum appliance thickness, a maximum overhang size, a maximum overhang angle, and/or a maximum bridge size. The constraints can be based on capabilities and/or limitations of the direct fabrication process, such as a resolution of the direct fabrication process, a property of a material used in the direct fabrication process, an overhang size limit of the direct fabrication process, an overhang angle limit of the direct fabrication process, a bridge size limit of the direct fabrication process, and/or post-processing conditions. For example, one constraint can be that the minimum feature size of the appliance is at least a multiple of the minimum resolution of the direct fabrication process (e.g., the minimum feature size is at least 1×, 2×, 3×, 4×, 5×, or 10× greater than the minimum resolution). As another example, the constraints can prevent the appliance geometry from exceeding manufacturability hard limits. In yet another example, the constraints can require that the appliance geometry is a single, smooth connected shape with no discontinuities (e.g., islands that are unconnected to other parts of the appliance), holes, spikes, self-intersecting surfaces, and/or artifacts (e.g., image artifacts or other digital processing artifacts).

As another example, the manufacturability parameters can include adjustments to the appliance geometry, such as increasing feature size, decreasing feature size, changing feature location, increasing appliance thickness, decreasing appliance thickness, changing appliance orientation, and/or adding support structures. The adjustments can be configured to compensate for characteristics of the direct fabrication process, such as directional bias, resolution, overcuring, an expected amount of material shrinkage/expansion, post-processing conditions, and/or an expected change in a property and/or geometry after post-processing. The appliance design system 114 can use the manufacturability parameters to avoid appliance designs that may be difficult or impossible to manufacture via direct fabrication. The appliance design system 114 can also use the manufacturability parameters to adjust the appliance design to compensate for inaccuracies and/or changes to the geometry that may occur during manufacturing and/or post-processing.

Optionally, the appliance design parameters can include one or more efficacy parameters providing information that is useful for determining how to achieve the clinical goals of a particular treatment stage and/or of the overall treatment plan via the appliance geometry. Some or all of the efficacy parameters can be the same as the efficacy parameters used by the treatment planning system 112, or some or all of the efficacy parameters can be different from the efficacy parameters used by the treatment planning system 112.

In some embodiments, the efficacy parameters represent correspondences between appliance features and clinical goals. For example, the efficacy parameters can indicate a particular appliance feature (e.g., appliance thickness (such as discrete thickness values or a continuous thickness distribution), appliance stiffness (such as discrete stiffness values or a continuous stiffness distribution), feature type (such as ridges, dimples, blocks, etc.), feature size, feature shape, surface geometry, attachment location, attachment geometry, contact points) that should be used to achieve a particular clinical goal (e.g., a tooth to be moved, a tooth movement type, a tooth movement direction, a tooth movement amount, a tooth movement velocity, a magnitude of a force and/or torque to be applied to a tooth, a direction of a force and/or torque to be applied to a tooth). The appliance design system 114 can use the efficacy parameters to select appliance designs that would effectively achieve the clinical goals of the corresponding treatment stage.

In some embodiments, the appliance design parameters include one or more force system parameters that represent constraints and/or adjustments for a force system to be delivered to the patient's teeth by an appliance. For example, the force system parameters can include a maximum force and/or torque magnitude, a minimum force and/or torque magnitude, permissible force and/or torque directions, and/or impermissible force and/or torque directions. The force system parameters can be based on safety considerations, efficacy considerations, capabilities and/or limitations of the appliance, etc. The appliance design system 114 can use the force system parameters to generate appliance designs that deliver the desired force system for a particular treatment stage.

The appliance design system 114 can implement the appliance design parameters in various ways. For example, the appliance design system 114 can use the appliance design parameters to retrieve and/or generate a set of appliance design rules corresponding to the set of appliance design parameters. Alternatively, the appliance design system 114 can receive a generic set of appliance design rules, and then can modify the rules based on the appliance design parameters. In some embodiments, the appliance design system 114 uses a rule-based algorithm that implements the set of appliance design rules, with the appliance design parameters being the inputs to the rule-based algorithm.

The appliance design system 114 can then use the appliance design rules to produce the appliance design. For instance, the appliance design system 114 can create an initial appliance geometry for a particular treatment stage, e.g., by creating a 3D shape close to the surfaces of the teeth and having an initial thickness. The appliance design rules can provide instructions to adjust the initial appliance geometry to account for manufacturability and/or efficacy considerations, e.g., by modifying the surface, thickness, and/or shape of the initial appliance geometry. Alternatively or in combination, the appliance design rules can be implemented as branches in the appliance geometry design process. Optionally, certain rules may be prioritized over other rules during the appliance design process, such as by assigning different weights to rules associated with different goals (e.g., rules related to manufacturability may be prioritized over rules related to clinical efficacy, or vice-versa). Additional details and examples of the appliance design process are provided further below.

The appliance design generated by the appliance design system 114 can be transmitted to other components of the ecosystem 100a, such as the clinician system 110, treatment planning system 112, patient system 122, and/or appliance fabrication systems 116. For example, the appliance design can be transmitted to the appliance fabrication systems 116 as a set of instructions to control the appliance fabrication systems 116 in fabricating an appliance having the design. In some embodiments, the instructions are or include a 3D digital representation of the appliance design, such as a CAD file, STL file, OBJ file, AMF file, 3MF file, etc. Alternatively or in combination, the instructions can include a toolpath file that is in a format suitable for direct input to the controller of the appliance fabrication systems 116, such as a G-code file.

Optionally, the appliance design system 114 can perform automatic quality control on the generated appliance design before sending the design to the appliance fabrication system 116. The quality control process can check for manufacturability and/or geometry issues, such as mesh quality, self-intersections, discontinuities (e.g., floating islands or other unsupported structures), holes, spikes, artifacts, and the like. The quality control process can also check for clinical issues, such as whether the appliance geometry conforms to engineering specifications (e.g., design tolerances, limits).

The appliance fabrication systems 116 include one or more systems that manufacture appliances via direct fabrication (e.g., direct fabrication system 118) and/or indirect fabrication (e.g., indirect fabrication system 120), based on the instructions from the appliance design system 114. The appliance fabrication systems 116 can include physical hardware (e.g., 3D printers, thermoforming systems) as well as software for controlling such hardware.

For example, the direct fabrication system 118 can be an additive manufacturing system. Additive manufacturing (also referred to herein as "3D printing") includes a variety of technologies which fabricate 3D objects directly from digital models through an additive process. In some embodiments, additive manufacturing includes depositing a precursor material onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry. Additional details and examples of additive manufacturing techniques are provided in Section III below.

The indirect fabrication system 120 can be a thermoforming system. Thermoforming can involve producing a positive or negative mold of the patient's dentition in a target arrangement (e.g., by additive manufacturing, milling, etc.), then thermoforming one or more sheets of material over the mold in order to generate a dental appliance. In some embodiments, the indirect fabrication system 120 is used in situations where the appliance design cannot be produced by direct fabrication, as discussed further below.

In some embodiments, the appliance fabrication systems 116 receive a digital representation of the appliance design from the appliance design system 114 (e.g., a 3D model of the appliance geometry), and convert the digital representation into a toolpath file (e.g., a G-code file). The appliance fabrication systems 116 can also determine other manufacturing parameters, such as layout, orientation, slicing, and/or support structures. Alternatively, some or all of these processes can instead be performed by the appliance design system 114.

The patient system 122 can include hardware and/or software components that interface with the patient 102. For example, the patient system 122 can provide a software portal that allows the patient to communicate with the clinician 104 (e.g., online scheduling, locating clinicians). The patient 102 can also use the software portal to view the treatment plans, e.g., via a user interface that provides a visualization of planned and/or actual treatment outcomes. The patient system 122 can also allow the patient 102 to submit progress tracking and/or case assessment data, such as images of the patient's teeth obtained via a mobile device (e.g., smartphone) or camera. The patient system 122 can also provide tools for managing appliance ordering and/or shipment, as well as viewing related financial information.

The communication system 124 can be or include any suitable hardware and software components for operably coupling the various components of the ecosystem 100a to each other, and can include one or more buses, networks, runtime linkers that connect pieces of code, etc. For example, the communication system 124 can be or include a communication network, such as one or more of the following: a wired network, a wireless network, a metropolitan area network (MAN), a local area network (LAN), a wide area network (WAN), a virtual local area network (VLAN), an internet, an extranet, an intranet, and/or any other suitable type of network or combinations thereof.

Any of the components of the ecosystem 100a shown as distinct components in FIG. 1A can be combined and/or include interrelated code. Any of the components of the ecosystem 100a can be implemented as a single and/or interrelated piece of software, or as different pieces of software. Any of the components of the ecosystem 100a can be embodied on a single machine or any combination of multiple machines. For example, the clinician system 110, treatment planning system 112, and/or appliance design system 114 can be combined with each other and/or with other components such as the dental imaging system 106, appliance fabrication system 116, and/or the patient system 122. Additionally, any of the treatment management systems 108 can share modules and/or devices with the appliance fabrication system 116. Any of the treatment management systems 108 can provide software to visualize the appliance designs generated by the appliance design system 114. Optionally, the appliance fabrication system 116 can include the appliance design system 114. The appliance fabrication system 116 can be part of the treatment management systems 108, or can be a separate component.

Figure 1B:
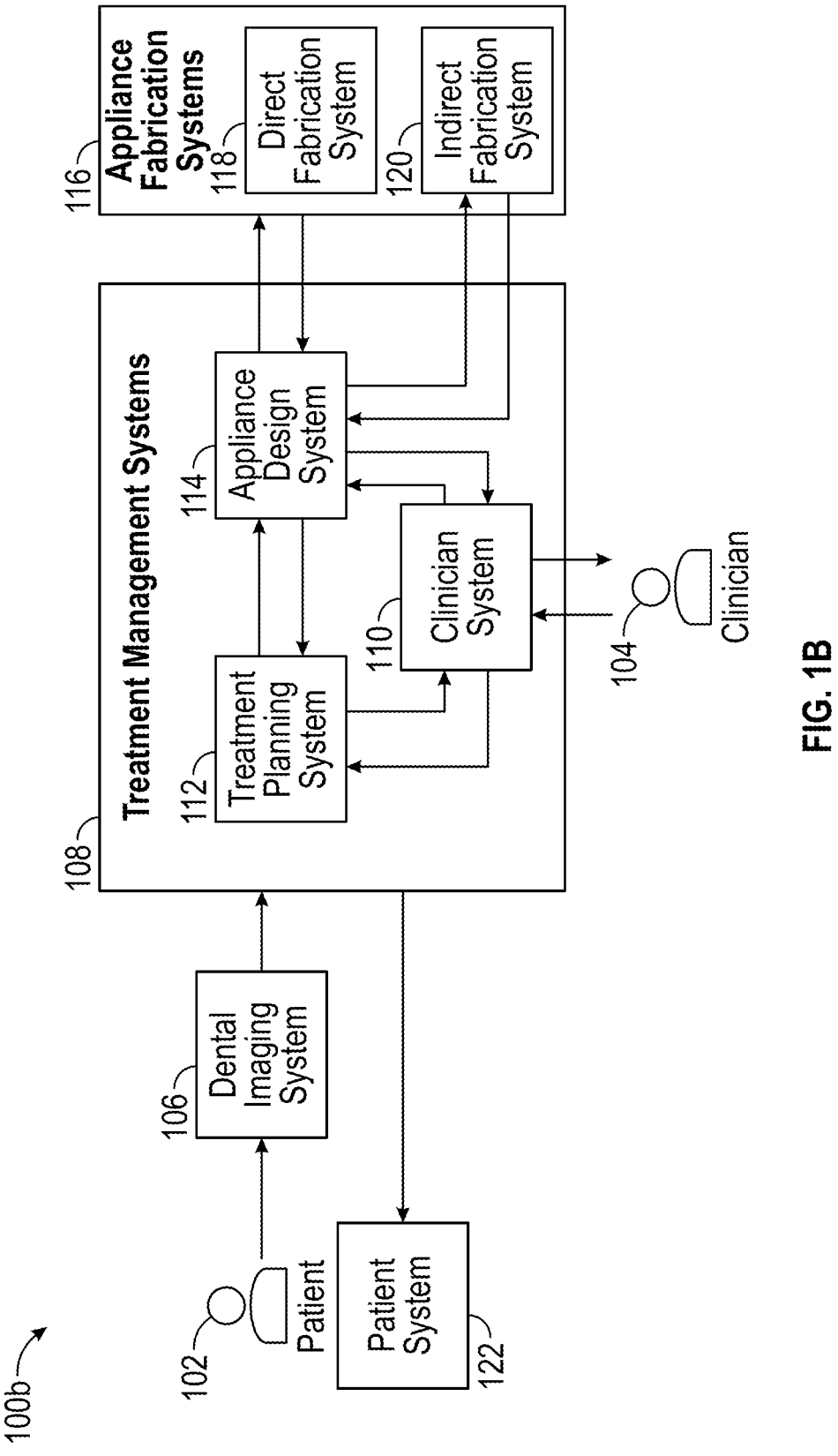
FIG. 1B is a schematic diagram illustrating a treatment planning and appliance generation workflow that may be implemented by components of the ecosystem of FIG. 1A, in accordance with embodiments of the present technology.

FIG. 1B is a schematic diagram illustrating a treatment planning and appliance generation workflow 100b that may be implemented by components of the ecosystem 100a of FIG. 1A, in accordance with embodiments of the present technology. The workflow 100b can begin with imaging the dentition of the patient 102 using the dental imaging system 106, such as by capturing images using a camera of a mobile device (e.g., smartphone), intraoral scanning, X-ray imaging, CBCT imaging, or suitable combinations thereof. The dental imaging system 106 can use the image data to generate one or more 3D dental models of the patient's teeth, which can then be transmitted to the treatment management systems 108.

The treatment planning system 112 generates a treatment plan for the patient's teeth, using the 3D model(s) from the dental imaging system 106 and based on a treatment prescription received from the clinician system 110. The treatment plan can be transmitted to the clinician system 110 for review by the clinician 104. For example, the treatment planning system 112 can produce a plurality of digital representation of treatment stages for repositioning the teeth, which can be displayed to the clinician 104 via a user interface of the clinician system 110. Feedback from the clinician 104 can be relayed by the clinician system 110 to the treatment planning system 112 for generating a revised treatment plan. The process of reviewing and revising the treatment plan can be iteratively repeated until the clinician 104 approves the plan. Optionally, the treatment plan can also be generated and/or modified based on manufacturability parameters provided by the appliance design system 114.

Once approved, the treatment plan is transmitted by the treatment planning system 112 to the appliance design system 114. The treatment planning system 112 can optionally provide other information to the appliance design system 114, such as clinically relevant goals, appliance design parameters, and/or manufacturing constraints. The appliance design system 114 can determine a design for at least one appliance configured to implement the treatment plan. In some embodiments, the appliance design system 114 provides the appliance design to the clinician system 110 for review by the clinician 104. The clinician 104 can provide feedback on the appliance design, which can be transmitted to the appliance design system 114 and used to revise the appliance design. In other embodiments, the appliance design can be created without any feedback or interactions with the clinician system 110.

The appliance design system 114 can transmit a digital representation of the appliance design to the direct fabrication system 118. In some embodiments, the appliance design system 114 performs a quality check of the appliance design before sending the design to the direct fabrication system 118. Alternatively or in combination, the quality check process can be performed by the direct fabrication system 118. The quality check can evaluate whether the appliance design can be feasibly manufactured using the direct fabrication technique implemented by the direct fabrication system 118. If the appliance design does not pass the quality check, the design can be revised by the appliance design system 114.

Once the appliance design passes the quality check, the direct fabrication system 118 can manufacture the appliances via a direct fabrication process. The direct fabrication system 118 can provide appliance information to the clinician system 110, such as appliance order information, shipping information, etc. The appliance information can also be transmitted to the patient system 122.

In some embodiments, if the appliance design fails the direct fabrication quality check after a specified number of iterations or is otherwise deemed to be unfeasible for manufacturing via direct fabrication, the appliance design system 114 can instead transmit instructions to the indirect fabrication system 120 to manufacture the appliance via indirect fabrication. The indirect fabrication system 120 can implement its own quality check process, and can provide the quality check results to the appliance design system 114 for modifying the appliance design. Alternatively, the appliance design system 114 can implement the quality check process and can provide the instructions to the indirect fabrication system 120 after the quality check has been completed.

Figure 1C:
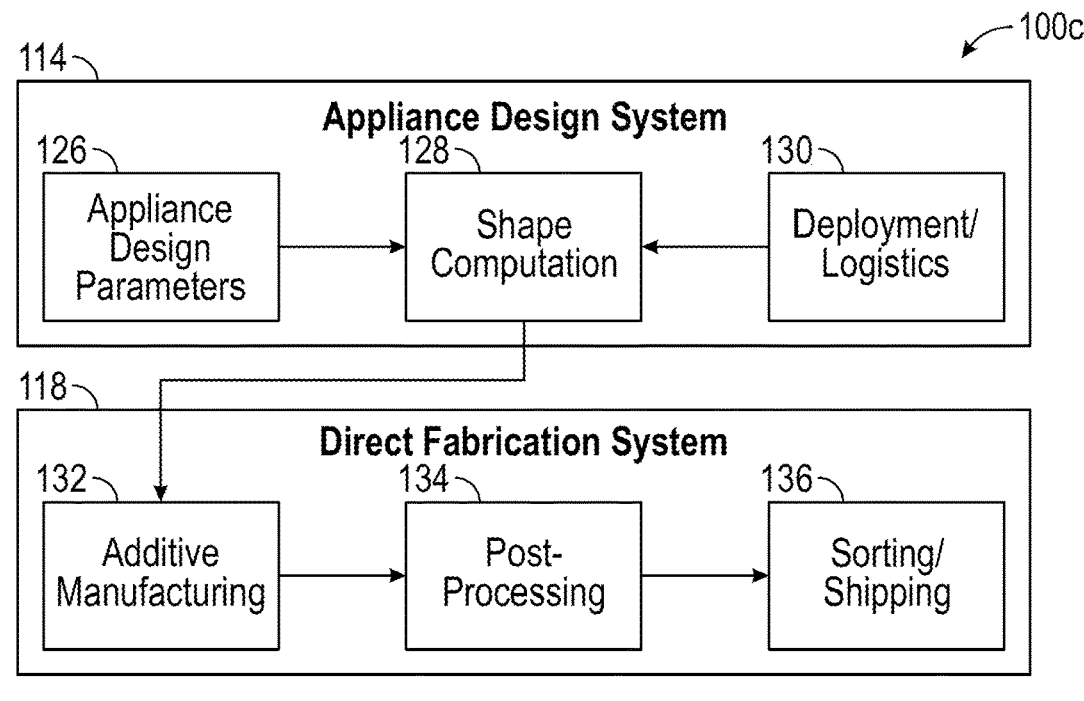
FIG. 1C is a schematic diagram illustrating an appliance design and fabrication workflow that may be implemented by the appliance design system and the direct fabrication system of FIG. 1A, in accordance with embodiments of the present technology.

FIG. 1C is a schematic diagram illustrating an appliance design and fabrication workflow 100c that may be implemented by the appliance design system 114 and the direct fabrication system 118 of FIG. 1A, in accordance with embodiments of the present technology. In the illustrated embodiment, the appliance design system 114 can retrieve a set of appliance design parameters 126. The appliance design parameters 126 can include manufacturability parameters, efficacy parameters, and/or force system parameters, as described elsewhere herein. Optionally, the appliance design parameters 126 can be or include product-specific design parameters that are customized based on the type of appliance being generated. For instance, different types of appliances such as aligners, palatal expanders, retainers, attachment placement devices, etc., may be produced using different types of materials and/or manufacturing processes, may include different appliance features, may involve different tooth movements and/or forces, etc. Accordingly, some or all of the appliance design parameters 126 can be customized and/or adjusted to accommodate such product-specific design considerations.

The appliance design parameters 126 can be used in a shape computation process 128 performed by the appliance design system 114. The shape computation process 128 can be a cloud-based process, an on-premises process, or suitable combinations thereof. The shape computation process 128 can be used to determine a digital representation of the geometry of an appliance, in accordance with the appliance design parameters 126 and/or from appliance design rules based on the appliance design parameters 126. The shape computation process 128 can also include performing quality controls on the digital representation for mesh quality, compliance with engineering specifications, etc.

In some embodiments, the shape computation process 128 interfaces with a deployment/logistics process 130. The deployment/logistics process 130 can provide updates to the algorithms used in the deployment/logistics process 130 to ensure regulatory compliance (e.g., in accordance with regulations on software for designing medical devices). The deployment/logistics process 130 can also ensure continuous deployment of appliances by quickly addressing any issues that may arise with the shape computation process 128.

The digital representations of appliances produced by the appliance design system 114 can be transmitted to the direct fabrication system 118 for fabrication via an additive manufacturing process 132 (e.g., a 3D printing process). The direct fabrication system 118 can include manufacturing software for multiple product types, printer types, and/or manufacturing facilities. The software can determine 3D layouts of parts, perform printer-specific splicing, maintain load balancing between the same printer types, and/or perform manual or automated quality control of printed parts.

After fabrication, the appliances can undergo a post-processing operation 134. The post-processing operation 134 can include removing residual material from the appliances, post-curing the appliances, separating the appliances from sacrificial components (e.g., support structures), washing, polishing, and/or any other processes to prepare the appliances for use. The appliances can then be packaged in a sorting/shipping operation 136. In some embodiments, the sorting/shipping operation 136 involves reading the part identifier for each appliance, then sorting, boxing, and shipping the appliances accordingly.

Figure 1D:
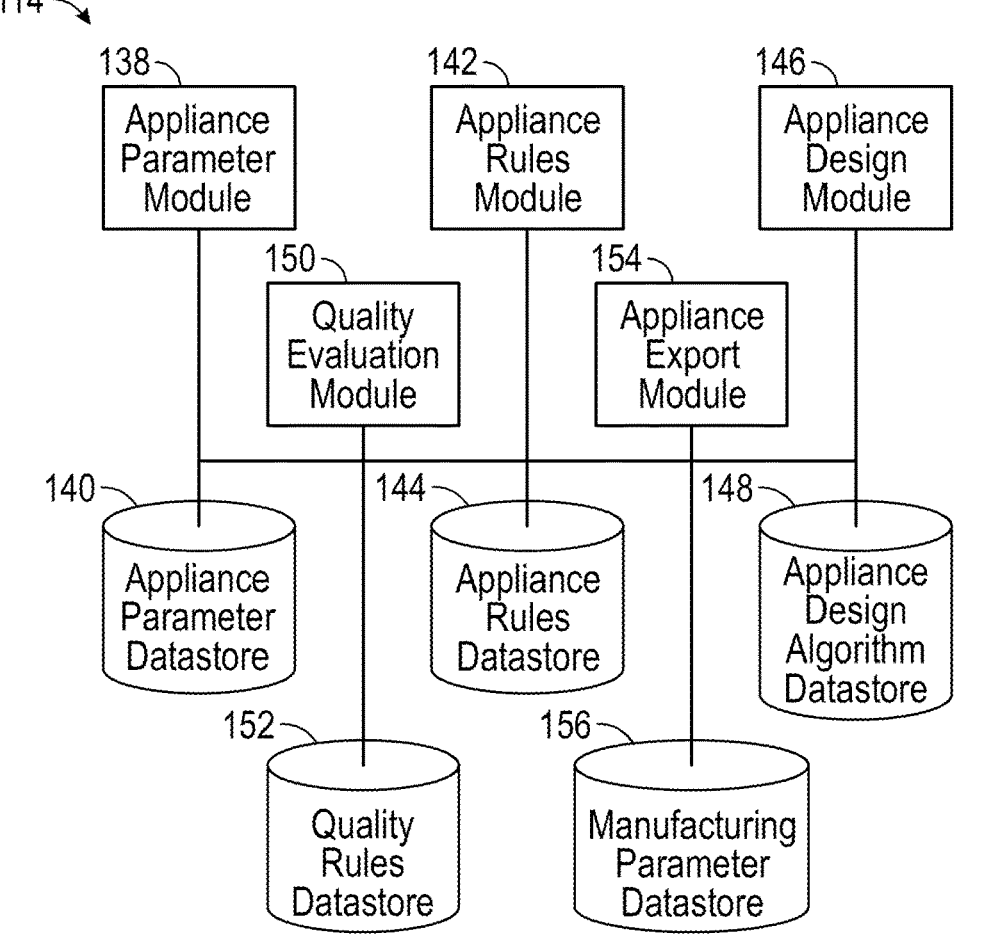
FIG. 1D is a schematic diagram illustrating an example architecture for the appliance design system of FIG. 1A, in accordance with embodiments of the present technology.

FIG. 1D is a schematic diagram illustrating an example architecture for the appliance design system 114 of FIG. 1A, in accordance with embodiments of the present technology. The appliance design system 114 can include a plurality of functional modules, each of which can include any suitable combination of hardware and software components. For example, the appliance design system 114 can include an appliance parameter module 138 that retrieves, generates, and/or modifies appliance design parameters (e.g., manufacturability parameters, efficacy parameters, force system parameters, product-specific parameters). The appliance parameter module 138 can be operably coupled to an appliance parameter datastore 140 for storing the appliance design parameters. The appliance rules module 142 can retrieve, generate, and/or modify appliance design rules based on the appliance design parameters. The appliance rules module 142 can be operably coupled to an appliance rules datastore 144 for storing the appliance design rules.

The appliance design module 146 can implement one or more software algorithms (e.g., rule-based algorithms, machine learning algorithms) that generate a digital representation of the appliance shape, based on the appliance design parameters and/or appliance design rules. The digital representation can be a digital model, such as a surface model, mesh model, parametric model, etc. The appliance design module 146 can be operably coupled to an appliance design algorithm datastore 148 for storing the algorithms used by the appliance design module 146.

The quality evaluation module 150 can perform quality checks on the appliance shape produced by the appliance design module 146. The quality checks can evaluate whether the appliance shape complies with certain quality rules, such as rules pertaining to manufacturability, engineering specifications, clinical constraints, etc. The quality evaluation module 150 can be operably coupled to a quality rules datastore 152 for storing the quality rules.

The appliance export module 154 can convert the digital representation of the appliance shape into a format suitable for controlling a direct fabrication system (e.g., a toolpath file format). For example, the appliance export module 154 can perform splicing, generate support structures, and/or determine the optimal part orientation for printing. The appliance export module 154 can also generate layouts of multiple parts to be manufactured in the same fabrication process. The appliance export module 154 can be operably coupled to a manufacturing parameter datastore 156 storing information for the direct fabrication process to be used, such as printer parameters, material information, process conditions, etc.

Any of the components of the appliance design system 114 shown as distinct components in FIG. 1D can be combined and/or include interrelated code. Any of the components of the appliance design system 114 can be implemented as a single and/or interrelated piece of software, or as different pieces of software. Any of the components of the appliance design system 114 can be embodied on a single machine or any combination of multiple machines. For example, the appliance parameter module 138, appliance rules module 142, and/or appliance design module 146 can be combined with each other. Similarly, the appliance parameter datastore 140, appliance rules datastore 144, and/or appliance design algorithm datastore 148 can also be combined.

Figure 2:
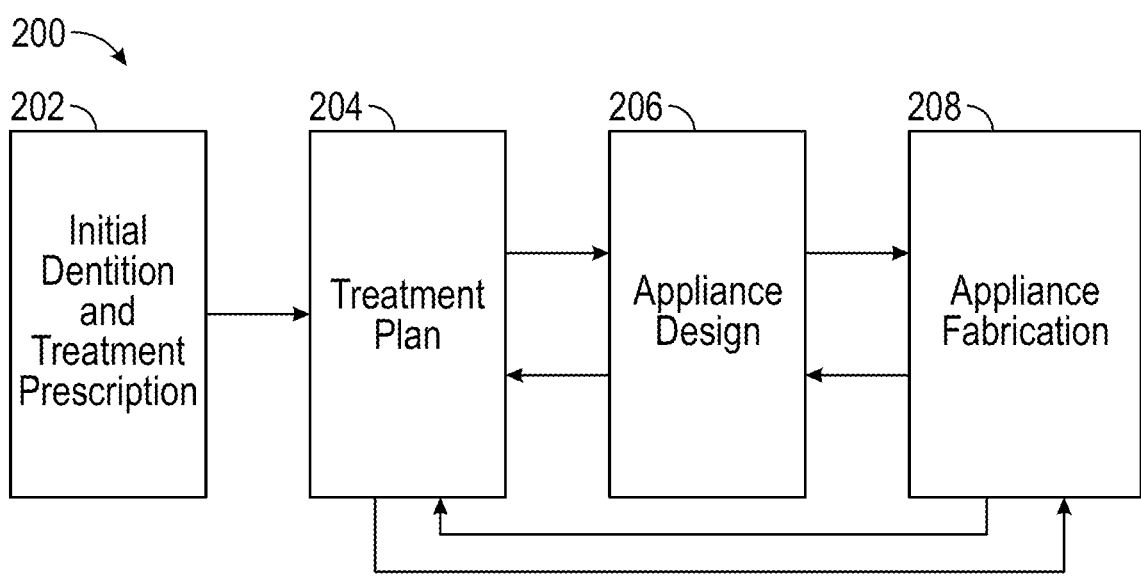
FIG. 2 is a schematic diagram illustrating a general overview of a treatment planning and appliance generation workflow, in accordance with embodiments of the present technology.

FIG. 2 is a schematic diagram illustrating a general overview of a treatment planning and appliance generation workflow 200, in accordance with embodiments of the present technology. The workflow 200 can be implemented by any of the systems and devices described herein, such as one or more of the components of the ecosystem 100a of FIGS. 1A-1D.

The workflow 200 can begin at block 202 with receiving information regarding a patient's initial dentition (e.g., raw tooth geometries and/or initial tooth positions) and a prescription for treatment (e.g., treatment goals and/or requested treatment parameters). For example, the information can be received from the dental imaging system 106 and/or clinician system 110 of FIG. 1A.

At block 204, the workflow 200 includes generating a treatment plan. The treatment plan can be produced by the treatment planning system 112 of FIG. 1A. The generated treatment plan can include final geometries and/or positions for one or more teeth in the patient's dentition, as well as tooth movement paths for achieving the final positions. The tooth movement paths can be subdivided into a sequence of treatment stages for incrementally repositioning the teeth from their initial positions toward the final positions. Optionally, the treatment plan output can also include selected appliance features for facilitating the planned tooth movements and/or other desired clinical outcomes. The appliance features can be rule-based features, heuristically-optimized features, or suitable combinations thereof.

At block 206, the workflow 200 includes designing one or more appliances to implement the treatment plan. The appliance design can be determined by the appliance design system 114 of FIG. 1A. The appliance design can be produced by an appliance design algorithm that outputs a digital representation (e.g., a 3D model) of the appliance. For example, the appliance design algorithm can output a thickness map indicating the distribution of thickness values at some or all locations of the appliance. The thickness map can be created using a lookup table, simulation, optimization function, or other suitable technique. In some embodiments, the appliance design algorithm uses appliance design parameters (e.g., manufacturability, efficacy, and/or force system parameters) to place limits and/or constraints on the appliance geometry. The appliance design algorithm can also use the appliance design parameters and/or treatment parameters specified by the treatment plan to incorporate appliance features such as attachments, activations, contact or pressure points, etc. Additional details of the appliance design algorithm are provided below.

At block 208, the workflow 200 includes fabricating the appliance. The appliance can be fabricated by the appliance fabrication systems 116 of FIG. 1A (e.g., the direct fabrication system 118). In some embodiments, the appliance design produced in block 206 is used to produce direct fabrication instructions including a digital representation of the appliance geometry. For example, the digital representation can be a surface map or model depicting the 3D shape of the appliance shell. Optionally, the direct fabrication instructions can also include a digital representation of the geometry of at one or more additional components configured to be used with the appliance. Examples of such components include, but are not limited to, support structures, attachments to be mounted on the patient's teeth for engaging the appliance, templates for forming attachments on the teeth, attachment placement devices for locating prefabricated attachments on the teeth, identifiers for the appliance (e.g., embossed identification information, QR codes), and the like. Alternatively or in combination, the geometries of the additional components can be determined as part of the appliance design process of block 206.

In some embodiments, the process of block 208 includes performing a quality check of the appliance geometry before producing the fabrication instructions and/or initiating fabrication. As described in greater detail elsewhere herein, the quality check can include confirming that the appliance geometry is a single connected shape with no discontinuities, self-intersecting regions, holes, spikes, and/or artifacts. Optionally, the quality check can be performed partially or entirely as part of the appliance design process of block 206.

As represented by the arrows in FIG. 2, the workflow 200 can include interdependencies and/or feedback between the treatment planning, appliance design, and appliance fabrication processes described herein. For example, the treatment planning process of block 204 can be based at least partially on manufacturability parameters corresponding to the appliance fabrication process of block 206, such as process-specific capabilities, constraints, and/or conditions. In some embodiments, the process of block 204 considers not only the clinical goals of a particular treatment stage or plan (e.g., desired tooth positions and/or movements), but also whether it is possible to manufacture a directly fabricated appliance that implements the treatment stage or plan. Accordingly, the treatment planning can be optimized within the constraints imposed by the direct fabrication process. Additionally, the clinical goals and/or treatment plan can inform the selection of the appliance fabrication process of block 208, e.g., the fabrication parameters, material types, post-processing techniques, etc., can be customized for the particular treatment plan. For instance, treatment plans involving larger forces applied to teeth may require the use of higher modulus materials and/or longer curing times; treatment plans involving precise application of forces to specific locations on the teeth may require higher printer resolutions; and so on.

As another example, the appliance design process of block 206 can be based not only on the treatment plan and/or treatment parameters output by the process of block 204, but also on the manufacturability parameters corresponding to the appliance fabrication process of block 208, such as process-specific capabilities, constraints, and/or conditions. In some embodiments, the process of block 208 considers not only the appliance geometry and/or features that would effectively implement a particular treatment stage, but also whether it is possible to manufacture a directly fabricated appliance having that appliance geometry and/or features. Thus, the appliance design process can be optimized within the constraints imposed by the direct fabrication process. The appliance geometry and/or features can also inform the selection of the appliance fabrication process of block 208, e.g., the fabrication parameters, material types, post-processing techniques, etc., used to fabricate the appliance can be customized to the appliance design. For instance, appliance designs including small feature sizes and/or more complex geometries may require higher printer resolutions; appliance designs incorporating relatively fragile features may require more gentle post-processing conditions; and so on.

Moreover, any errors or other issues arising in connection with a particular process can be used to alter the parameters for another process. For example, if the appliance design fails the quality check for the appliance fabrication process of block 208, information regarding the failure can be used as feedback to the appliance design process of block 206 to modify the appliance design and/or relax appliance design parameters, so that the resulting appliance design is more likely to pass the quality check. Alternatively or in combination, information regarding quality check failure can be used as feedback to the treatment planning process of block 204 to modify the treatment plan, so that appliance design implementing the modified treatment plan is more likely to pass the quality check. This approach can be used to iteratively revise the appliance design until both clinical goals and manufacturability criteria are satisfied. Additional details regarding the quality check process are provided further below.

FIGS. 3A-6B illustrate representative examples of methods for treatment planning and appliance generation, in accordance with embodiments of the present technology. The methods of FIGS. 3A-6B can be performed using any of the systems and devices described herein, such as one or more of the components of the ecosystem 100a of FIGS. 1A-1D. In some embodiments, the methods of FIGS. 3A-6B are implemented by a computing system or device including one or more processors and a memory storing instructions that, when executed by the one or more processors, cause the computing system or the device to perform some or all of the operations described herein. For instance, the methods of FIGS. 3A-6B can be performed by any of the treatment management systems 108 of FIG. 1A, the appliance fabrication system 116 of FIG. 1A, or suitable combinations thereof. Any of the methods of FIGS. 3A-6B can be combined with each other and/or with any of the other methods described herein.

Figure 3A:
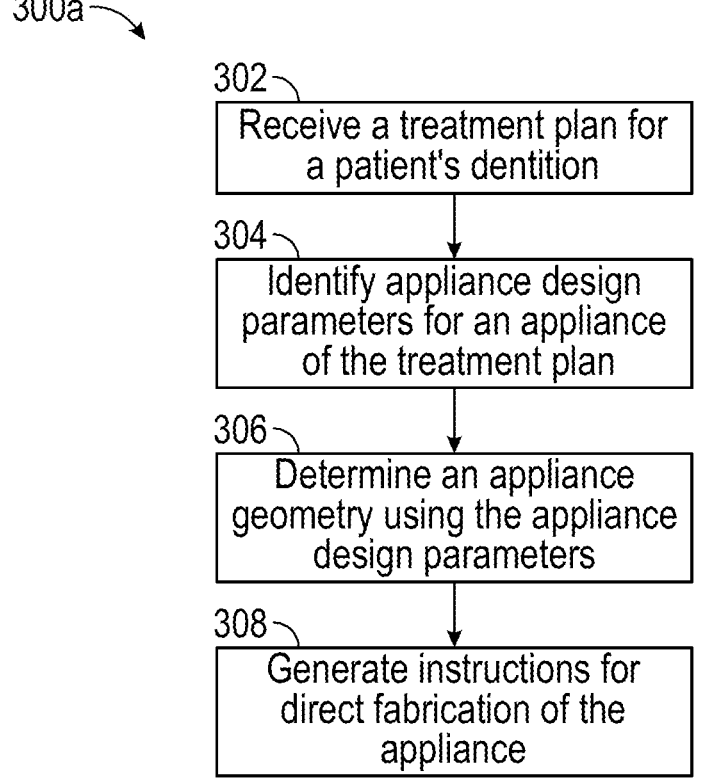
FIG. 3A is a flow diagram illustrating a method for generating appliances, in accordance with embodiments of the present technology.

FIG. 3A is a flow diagram illustrating a method 300a for generating appliances, in accordance with embodiments of the present technology. The method 300a begins at block 302 with receiving a treatment plan for a patient's dentition. The treatment plan can specify a target arrangement for the teeth (e.g., a final tooth position for each of the teeth), and a plurality of treatment stages to move the teeth from an initial arrangement toward the target arrangement. In some embodiments, the treatment plan also specifies relevant treatment parameters, such as tooth information (e.g., which teeth should or should not be treated, the geometry of the teeth), movement information (e.g., movement direction, movement velocity, movement type), appliance features (e.g., attachments, attachment receptacles, tooth-contacting regions, non-tooth-contacting-regions, activations, bite ramps, mandibular advancement wings, and/or cutlines), treatment protocols for specific types of malocclusions, staging for treatment procedures, constraints, modifications, etc.

At block 304, the method 300a can include identifying one or more appliance design parameters for at least one appliance of the treatment plan. The appliance design parameters can be identified based on the direct fabrication process to be used to manufacture the appliances for implementing the treatment plan, the type of appliances for implementing the treatment plan, the type of material to be used for the appliances, and/or the clinical goals of the treatment plan, among other considerations. In some embodiments, the appliance design parameters include one or more manufacturability parameters correlating to the constraints, capabilities, and/or process conditions of the direct fabrication process. For example, the manufacturability parameters can include constraints on the appliance geometry (e.g., minimum feature size, maximum feature size, minimum appliance thickness, maximum appliance thickness, maximum overhang size, maximum bridge size), which can be determined based on capabilities and/or limitations of the direct fabrication process (e.g., printer resolution, overcuring, material properties, overhang size limit, bridge size limit, and/or post-processing conditions). As another example, the manufacturability parameters can include adjustments to the appliance geometry (e.g., increasing or decreasing feature size, changing feature location, increasing or decreasing appliance thickness, changing appliance orientation, adding support structures), which can be used to compensate for characteristics of the direct fabrication process (e.g., directional bias, resolution, material shrinkage/expansion, post-processing conditions).

Optionally, the appliance design parameters can also include one or more efficacy parameters providing information that is useful for determining how to achieve the clinical goals of a particular treatment stage and/or of the overall treatment plan via the appliance geometry. In some embodiments, the efficacy parameters represent correspondences between appliance features and clinical goals, such as a particular appliance feature (e.g., appliance thickness, appliance stiffness, feature size, feature shape, surface geometry, attachment location, attachment geometry, contact points) that is expected to be effective in producing a particular clinical goal (e.g., a tooth to be moved, a tooth movement type, a tooth movement direction, a tooth movement amount, a tooth movement velocity, a force to be applied to a tooth).

The appliance design parameters can optionally include one or more force system parameters that represent constraints and/or adjustments for a force system to be delivered to the patient's teeth by an appliance. For example, the force system parameters can include a maximum force and/or torque magnitude, a minimum force and/or torque magnitude, permissible force and/or torque directions, and/or impermissible force and/or torque directions.

At block 306, the method 300a can include determining an appliance geometry using the appliance design parameters. The appliance geometry can be determined for one or more dental appliances configured to implement one or more corresponding treatment stages of the treatment plan. For example, the appliance(s) can include an aligner configured to reposition the patient's teeth toward an intermediate arrangement specified by the corresponding treatment stage; a palatal expander configured to incrementally increase a palatal width of the patient over one more treatment stages; or any of the other appliance types described herein. The process of block 306 can include determining a geometry for each dental appliance, such that the dental appliance implements the corresponding treatment stage of the treatment plan while also complying with at least some or all of the appliance design parameters. For example, the process of block 306 can involve determining a 3D shape of a shell of the dental appliance, the shell having a plurality of teeth-receiving cavities configured to apply forces to one or more teeth to reposition the teeth toward the intermediate arrangement of the corresponding treatment stage. The appliance geometry can also include 3D shapes of one or more appliance features coupled to, integrally formed with, or otherwise designed to interact with the shell, such as attachments, attachment receptacles, tooth-contacting regions, non-tooth-contacting-regions, activations, bite ramps, mandibular advancement wings, and/or cutlines.

The appliance geometry can be determined and/or optimized based on the appliance design parameters of block 304. For instance, the appliance geometry can be designed to comply with constraints imposed by one or more manufacturability parameters, e.g., the thickness of the appliance is within a permissible thickness range, the sizes of the appliance features are greater than or equal the minimum feature size, etc. The appliance geometry can also be modified according to adjustments specified by one or more manufacturability parameters, e.g., appliance features can be resized and/or relocated to compensate for printer bias, overcuring, material expansion/shrinkage, etc. Optionally, the shapes of the shell, teeth-receiving cavities, and/or appliance features can be selected for clinical efficacy in implementing the treatment stage, based on one or more efficacy parameters. The appliance geometry can also be designed to comply with the constraints and/or adjustments specified by one or more force system parameters.

For example, overcuring during additive manufacturing can cause the actual size (e.g., thickness, length, and/or width) of an appliance feature to be larger than the intended size for the feature. To compensate for this effect, the appliance feature can be designed with a reduced size (e.g., a reduced thickness, length, and/or width) such that, when printed with overcuring, the actual size of the appliance feature matches or is similar to the intended size. In some embodiments, the amount of size reduction to compensate for overcuring is determined by predicting the amount of overcuring that will occur for a particular appliance feature (e.g., using simulations, machine learning models, rule-based algorithms, experimental and/or historical data), calculating a difference between the intended and predicted actual size of the appliance feature, then reducing the size of the appliance feature based on the calculated difference.

As another example, certain portions of an appliance may be susceptible to deforming (e.g., flaring, warping, bending) during additive manufacturing and/or post-processing, e.g., due to the weight and/or geometry of the appliance, material expansion and/or shrinkage, forces applied to the appliance (e.g., centrifugation forces, peel-off forces), etc. To reduce the likelihood of deformation, support structures to reinforce the structural strength of the appliance can be added, such as crossbars, blocks, struts, and the like. Other mitigation techniques can include changing an orientation of the appliance and/or changing a position of the appliance on the build platform (e.g., different portions of the build platform may be subjected to different forces). In some embodiments, the appliance design process involves predicting whether an appliance portion is likely to exhibit deformation during additive manufacturing and/or post-processing (e.g., using simulations, machine learning models, rule-based algorithms, experimental and/or historical data), then determining the appropriate mitigation measures to be applied (e.g., adding support structures, changing appliance orientation and/or position).

In a further example, appliance features that are smaller than a minimum resolution of the additive manufacturing system can be modified or removed altogether. The printer resolution can depend on the particular hardware configuration of the additive manufacturing system, e.g., the minimum resolution can correspond to the laser spot size for a stereolithography system, the pixel size for a digital light processing system, etc. In some embodiments, the appliance geometry is checked to identify any portions having a size smaller than the minimum resolution, and the identified portions can be omitted from the final appliance design or can be modified (e.g., increased in size).

In yet another example, appliance features that have a significant amount of overhang may need to be supported during additive manufacturing, or may need to be modified to reduce the amount of overhang. In some embodiments, the appliance geometry is checked to identify any portions having an amount of overhang that exceeds manufacturability limits. The identified portions can then be modified, such as by adding support structures to support the overhang and/or by changing the appliance geometry to reduce the amount of overhang.

In some embodiments, the process of block 306 involves using a rule-based algorithm to generate the appliance geometry. The rules for the rule-based algorithm can be predetermined appliance design rules that are retrieved from a datastore (e.g., the appliance rules datastore 144 of FIG. 1D). For instance, there may be predetermined appliance design rules for particular appliance types (e.g., aligners versus palatal expanders), particular material types (e.g., different polymeric resins), particular direct fabrication processes (e.g., stereolithography versus selective laser sintering), etc. In such embodiments, the predetermined appliance design rules can incorporate constraints, capabilities, process conditions, and/or adjustments associated with the particular appliance type, material type, direct fabrication process, etc. As one example, the predetermined appliance design rules can impose different constraints on the appliance geometry, depending on the type of appliance, the type of material to be used to fabricate the appliance, and/or the direct fabrication process to be used to fabricate the appliance.

Alternatively or in combination, some or all of the appliance design rules can be determined and/or generated based on the appliance design parameters. For example, the appliance design rules can specify that the appliance geometry should or must comply with the constraints imposed by one or more manufacturability parameters. As another example, the appliance design rules can specify that the adjustments indicated by one or more manufacturability parameters should be applied to the appliance geometry. In yet another example, the appliance design rules can specify that tooth movement should or must be accomplished using the appliance features indicated by one or more efficacy parameters. As a further example, the appliance design rules can specify that the forces and/or torques produced by the appliance geometry should or must comply with the constraints and/or adjustments indicated by one or more force system parameters.

The rule-based algorithm can apply the appliance design rules sequentially, concurrently, or suitable combinations thereof. Certain rules may be weighted more heavily than or otherwise prioritized over other rules. For instance, rules that would result in print failure if violated may be prioritized over rules that would still produce a printable design. In some embodiments, certain rules may be relaxed (e.g., modified or omitted) if it is too difficult to produce an appliance design that complies with that rule, while other rules may be strict rules that cannot be compromised under any circumstances. Optionally, the rule-based algorithm can use an iterative process in which an initial design is generated and checked for compliance with the appliance design rules. If the design does not satisfy certain rules, the design can be modified and/or the rules can be relaxed. This process can be repeated until a design that satisfies as many rules as possible and/or satisfies the most important rules is generated.

In some embodiments, the appliance geometry is determined based at least in part on a force system for achieving the clinical goals of a particular treatment stage. For instance, the force system can specify one or more forces and/or torques for achieving the tooth movements for the treatment stage. The force system can be determined based on literature, experimental data, modeling and/or simulations, clinical experience, etc., as described in greater detail elsewhere herein. Subsequently, the process of block 306 can include using the appliance design parameters, appliance design rules, and/or rule-based algorithm to generate an appliance geometry that delivers the force system to the patient's teeth. For example, the appliance design parameters, appliance design rules, and/or rule-based algorithm can specify the thickness of one or more portions of the appliance that would produce a desired force system on the teeth. As another example, the appliance design parameters, appliance design rules, and/or rule-based algorithm can specify one or more appliance features that could be used to deliver the desired force system to the teeth. Optionally, the appliance design parameters, appliance design rules, and/or rule-based algorithm can specify constraints and/or adjustments to the force system, such as a maximum force and/or torque magnitude, a minimum force and/or torque magnitude, permissible force and/or torque directions, impermissible force and/or torque directions, etc.

At block 308, the method 300a can include generating instructions for direct fabrication of the appliance(s). As described elsewhere herein, the instructions can include a 3D digital representation of the appliance design, a toolpath file generated from the 3D digital representation, or both. The instructions can then be transmitted to a direct fabrication system (e.g., the direct fabrication system 118 of FIG. 1A) for manufacturing the appliance(s).

Figure 3B:
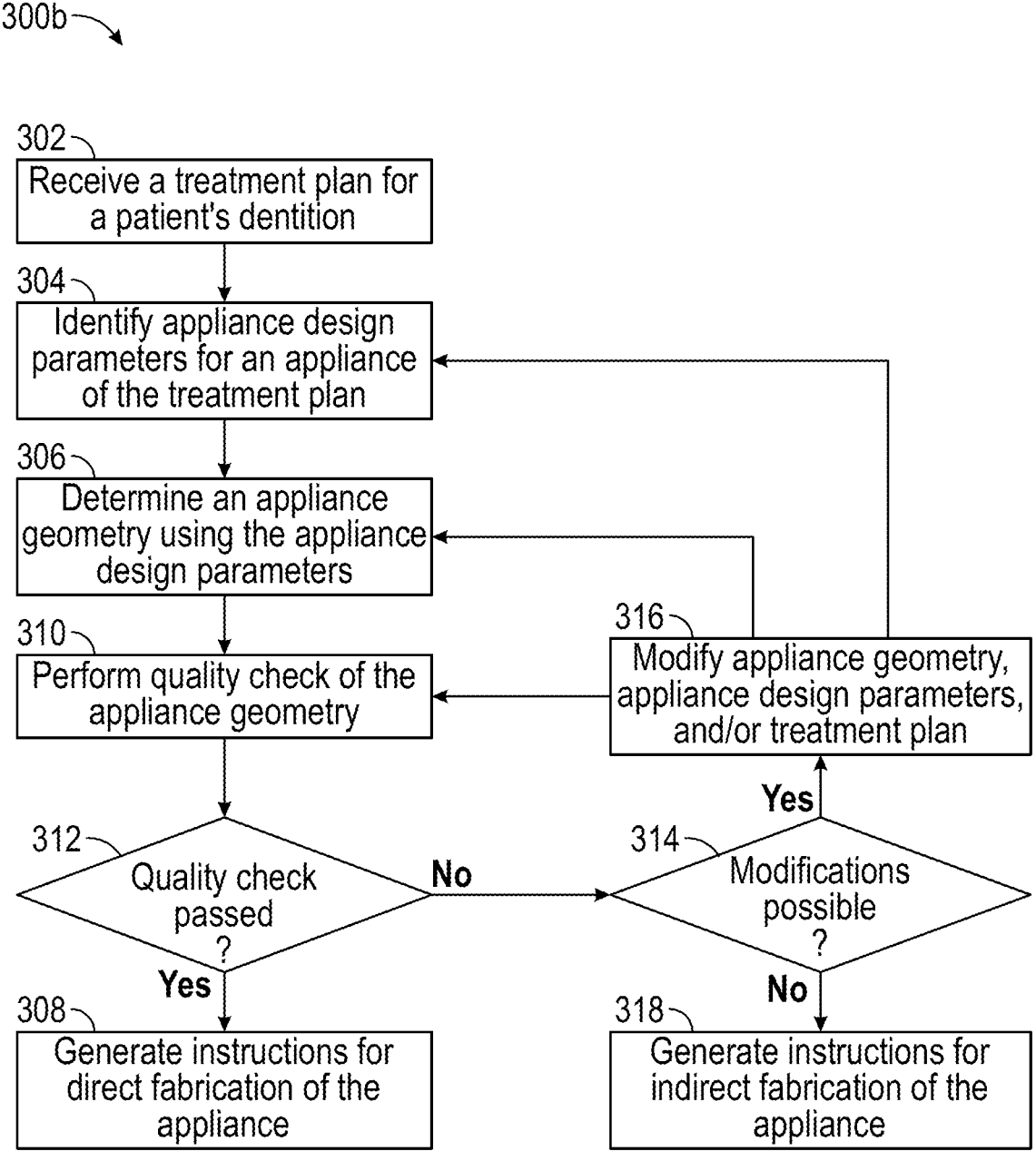
FIG. 3B is a flow diagram illustrating a method for generating appliances, in accordance with embodiments of the present technology.

FIG. 3B is a flow diagram illustrating a method 300b for generating appliances, in accordance with embodiments of the present technology. The method 300b can include receiving a treatment plan for a patient's dentition (block 302), identifying appliance design parameters (block 304), and determining an appliance geometry (block 306), as previously described in connection with FIG. 3A.

At block 310, the method 300b includes performing a quality check of the appliance geometry. The quality check can evaluate whether the appliance design can be feasibly manufactured via direct fabrication. In some embodiments, the quality check involves analyzing a digital representation of the appliance geometry for manufacturability and/or geometry issues, such as mesh quality, self-intersections, discontinuities (e.g., floating islands or other unsupported structures), holes, spikes, artifacts, and the like. The quality control process can also check for clinical issues, such as whether the appliance geometry conforms to engineering specifications (e.g., design tolerances, limits). Optionally, the quality check can evaluate whether the appliance geometry complies with one or more appliance design rules, which can include predetermined appliance design rules and/or rules generated based on the appliance design parameters, as previously described in connection with block 306 of FIG. 3A.

At block 312, if the appliance geometry passes the quality check, the method 300b proceed to block 308 to generate instructions for direct fabrication of the appliance, as previously described in connection with FIG. 3A. The appliance geometry can pass the quality check if there are no manufacturability, geometry, and/or clinical issues, and/or if the appliance geometry complies with most or all of the appliance design rules.

If the appliance geometry does not pass the quality check, the method 300b can instead proceed to block 314 with evaluating whether it is possible to modify the appliance geometry, appliance design parameters, and/or treatment plan so that the resulting appliance is manufacturable via direct fabrication without significantly compromising the clinical goals of the treatment plan. For instance, if the current appliance geometry is too thick at a particular location, the process of block 314 can evaluate whether it is possible to decrease the thickness at that location without significantly affecting tooth movement, whether it is possible to produce the same or similar tooth movement using a different appliance thickness and/or other appliance features (e.g., changing contact points, attachments, activations), or whether the tooth movement can be modified (e.g., changing movement direction and/or speed) or even omitted altogether. Certain types of modifications may be preferred over others. In some embodiments, for example, it may be preferable to modify the appliance geometry and/or relax the appliance design parameters, before modifying the treatment plan. Conversely, if a minor change to the treatment plan would result in a compliant appliance design, such a change may be preferred over more extensive modifications to the appliance geometry and/or design parameters.

If modifications are possible, the method 300b can proceed to block 316 with modifying the appliance geometry, appliance design parameters, and/or treatment plan. The quality check of blocks 310 and 312 can be repeated until the appliance geometry is satisfactory, at which point the method 300b can proceed to block 308 with producing instructions for direct fabrication, as previously described in connection with FIG. 3A.

If modifications are not possible (e.g., the changes to the appliance geometry, appliance design parameters, and/or treatment plan are too significant and/or difficult to implement), the method 300b can instead proceed to block 318 with generating instructions for indirect fabrication of the appliance. For instance, the instructions for indirect fabrication can include a 3D digital representation of a mold for fabricating the dental appliance via thermoforming. Optionally, the method 300b can also be rerouted to block 318 if the appliance geometry fails the quality check of block 310 too many times. Accordingly, indirect fabrication can serve as a fallback manufacturing technique for situations where a particular appliance design is not feasible for direct fabrication even after multiple iterations.

FIG. 4A is a flow diagram illustrating a method 400a for treatment planning and appliance design, in accordance with embodiments of the present technology. The method 400a can include obtaining image data of a patient's dentition (block 402), generating a 3D dental model from the image data (block 404), and generating a treatment plan from the 3D model that specifies a target tooth position and a plurality of treatment stages to reposition the teeth from the initial position toward the target position (block 406). The processes of blocks 402, 404, and 406 can be identical or generally similar to the corresponding processes described above in connection with FIGS. 1A-2.

At block 408, the method 400a can include identifying one or more appliance design parameters for the treatment plan. The process of block 408 can be identical or generally similar to the process of block 304 of FIG. 3A. For example, at least some of the appliance design parameters can relate to the manufacturability of the appliance, e.g., whether the designed appliance is suitable for manufacturing via a direct fabrication process (e.g., direct additive manufacturing of the appliance). For instance, the appliance design parameters can include one or more manufacturability parameters that relate to the constraints, capabilities, and/or process conditions of the direct fabrication process to be used to fabricate the appliance. The manufacturability parameters can include constraints on the appliance geometry, such as a minimum feature size, a maximum feature size, a minimum appliance thickness, a maximum appliance thickness, a maximum overhang size, a maximum overhang angle, or a maximum bridge size. Alternatively or in combination, the manufacturability parameters can include adjustments to the appliance geometry, such as increasing feature size, decreasing feature size, changing feature location, increasing appliance thickness, decreasing appliance thickness, changing appliance orientation, or adding support structures. The adjustments can be configured to compensate for characteristics of the direct fabrication process, such as directional bias, resolution, overcuring, an expected amount of material shrinkage/expansion, post-processing conditions, and/or an expected change in a property and/or geometry after post-processing.

Optionally, at least some of the appliance design parameters can relate to the efficacy of the appliance in achieving the planned treatment goals. For instance, the appliance design parameters can include one or more efficacy parameters providing information that is useful for determining how to achieve the clinical goals of a particular treatment stage and/or of the overall treatment plan via the appliance geometry. In some embodiments, the efficacy parameters represent correspondences between appliance features and clinical goals. For example, the efficacy parameters can indicate a particular appliance feature (e.g., appliance thickness, appliance stiffness, feature size, feature shape, surface geometry, attachment location, attachment geometry, contact points) that should be used to achieve a particular clinical goal (e.g., a tooth to be moved, a tooth movement type, a tooth movement direction, a tooth movement amount, a tooth movement velocity, a force to be applied to a tooth).

The appliance design parameters can optionally include one or more force system parameters that represent constraints and/or adjustments for a force system to be delivered to the patient's teeth by an appliance. For example, the force system parameters can include a maximum force and/or torque magnitude, a minimum force and/or torque magnitude, permissible force and/or torque directions, and/or impermissible force and/or torque directions.

At block 410, the method 400a can include identifying one or more appliance design rules based on the appliance design parameters. The rules can specify constraints on the appliance design such that the resulting design is suitable for direct fabrication. The rules can indicate, for example, avoiding certain types of tooth movements and/or avoiding excessive forces in certain portions of the appliance. In some embodiments, the rules are determined and/or generated based on the appliance design parameters of block 408. For example, the appliance design rules can specify that the appliance geometry should or must comply with the constraints imposed by one or more manufacturability parameters, should or must incorporate the adjustments specified by one or more manufacturability parameters, should or must incorporate the clinical considerations indicated by one or more efficacy parameters, should or must incorporate the constraints and/or adjustments indicated by one or more force system parameters, etc. Alternatively or in combination, the rules can include predetermined rules that are retrieved from a database, look up table, or other data structure (e.g., the appliance rules datastore 144 of FIG. 1D). For instance, there may be predetermined appliance design rules based on the constraints, capabilities, process conditions, adjustments, etc., for specific appliance types, material types, direct fabrication processes, etc., as previously described with respect to block 306 of FIG. 3A.

At block 412, the method 400a can include generating one or more appliance shapes for one or more treatment stages of the treatment plan, using the appliance design rules. For instance, the process of block 412 can involve using a rule-based algorithm to generate the appliance shape(s). The rule-based algorithm can apply the appliance design rules sequentially, concurrently, or suitable combinations thereof. Certain rules may be weighted more heavily than or otherwise prioritized over other rules. Certain rules may be strict rules, while other rules may be relaxed under certain circumstances. Optionally, the rule-based algorithm can use an iterative process in which an initial appliance shape is generated and checked for compliance with the appliance design rules. If the shape does not satisfy one or more rules, the shape can be modified and/or the one or more rules can be relaxed. This process can be repeated until a satisfactory appliance shape is generated for each of the one or more treatment stages.

In some embodiments, the appliance shape(s) are generated based at least in part on a force system for achieving the clinical goals of the one or more treatment stages. The process of block 412 can include using the appliance design rules and/or rule-based algorithm to generate an appliance geometry that delivers the force system to the patient's teeth. For example, the appliance design parameters, appliance design rules, and/or rule-based algorithm can specify the thickness of one or more portions of the appliance that would produce a desired force system on the teeth. As another example, the appliance design parameters, appliance design rules, and/or rule-based algorithm can specify one or more appliance features that could be used to deliver the desired force system to the teeth. Optionally, the appliance design parameters, appliance design rules, and/or rule-based algorithm can specify constraints and/or adjustments to the force system, such as a maximum force and/or torque magnitude, a minimum force and/or torque magnitude, permissible force and/or torque directions, impermissible force and/or torque directions, etc.

At block 414, the method 400a can include creating at least one digital appliance representation, using the appliance shape(s) for the treatment stages. For example, the digital representation can be a 3D model of the appliance (e.g., a mesh model or surface model). The digital representation can be part of a CAD file, STL file, OBJ file, AMF file, 3MF file, etc.

At block 416, the method 400*a* can include instructing an additive manufacturing system to manufacture one or more appliances using the digital appliance representation(s). As described elsewhere herein, the instructions can include the digital appliance representation, a toolpath file generated from the digital appliance representation, or both. The instructions can then be transmitted to an additive manufacturing system for directly fabricating the appliance(s).

Figure 4B:
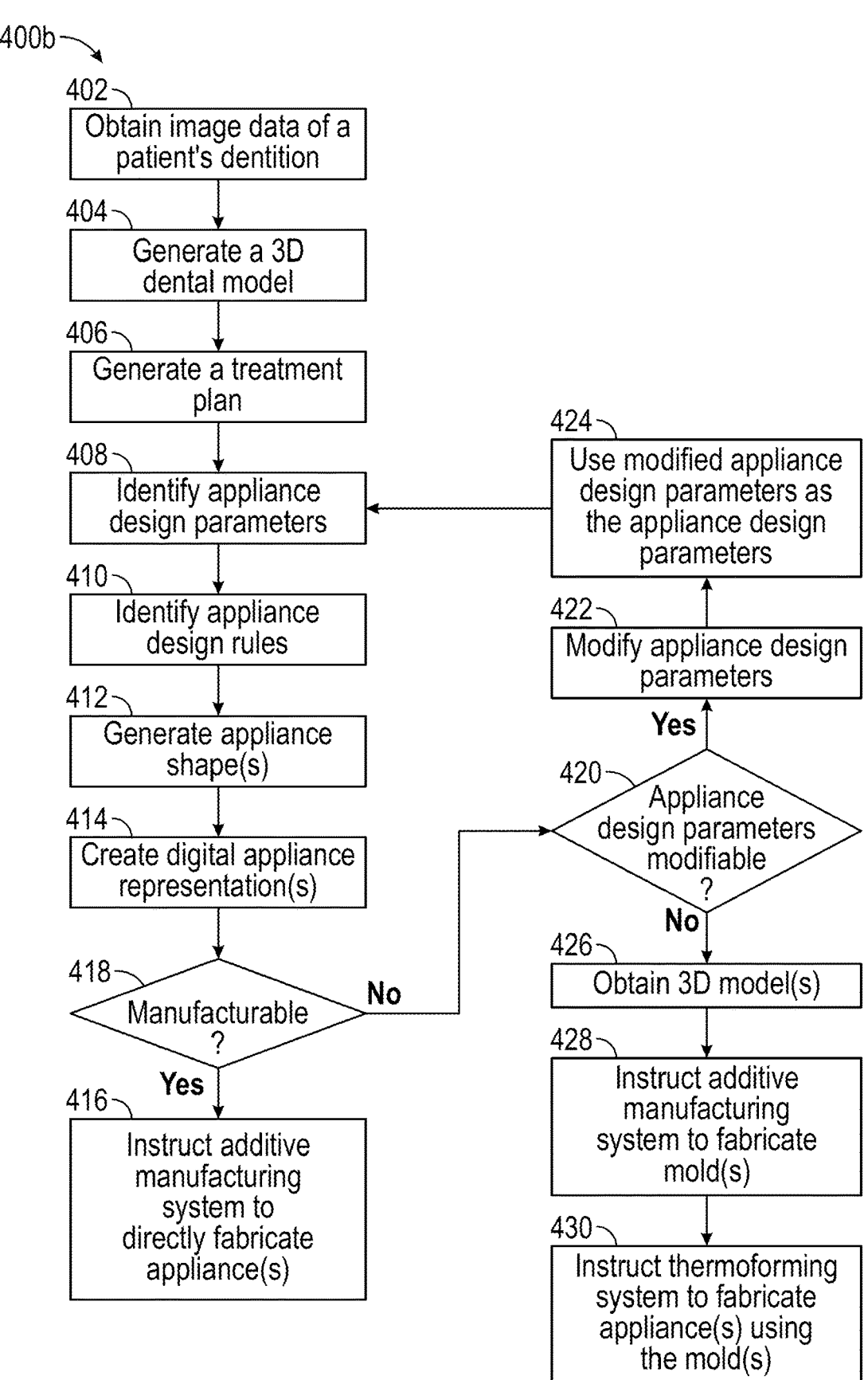
FIG. 4B is a flow diagram illustrating a method for treatment planning and appliance design, in accordance with embodiments of the present technology.

FIG. 4B is a flow diagram illustrating a method 400*b* for treatment planning and appliance design, in accordance with embodiments of the present technology. The method 400*a* can include obtaining image data of a patient's dentition (block 402), generating a 3D dental model from the image data (block 404), and generating a treatment plan (block 406), identifying appliance design parameters (block 408), identifying appliance design rules (block 410), generating appliance shapes (block 412), and creating digital appliance representation(s) (block 414), as previously described in connection with FIG. 4A.

At block 418, the method 400*b* can include determining whether the digital appliance representation(s) satisfy one or criteria for direct additive manufacturing. For instance, the process of block 418 can include performing quality control checks, such as evaluating whether each digital appliance representation is a single, smooth connected shape, does not include any islands and/or self-intersections, has a minimum feature size greater than or equal to a multiple of the minimum printer resolution, conforms to design tolerance and/or limits, does not violate any safety constraints (e.g., maximum stiffness), and/or other quality control checks.

Optionally, some or all of the criteria can be based on manufacturability parameters, such as manufacturability parameters relating to the constraints, capabilities, and/or process conditions of the direct additive manufacturing process to be used to fabricate the appliance. Such manufacturability parameters can include constraints on the appliance geometry, such as a minimum feature size, a maximum feature size, a minimum appliance thickness, a maximum appliance thickness, a maximum overhang size, a maximum overhang angle, or a maximum bridge size. In some embodiments, some or all of the criteria are represented by appliance design rules implementing the manufacturability parameters, such that the process of block 418 involves checking whether the digital appliance representation(s) comply with the rules. Some or all of the manufacturability parameters and/or appliance design rules can be the same as the manufacturability parameters and/or appliance design rules used in the processes of blocks 408 and 410, respectively, or some or all of the manufacturability parameters and/or appliance design rules can be different from the manufacturability parameters and/or appliance design rules used in the processes of blocks 408 and 410, respectively.

If the digital representation(s) satisfy the criteria, the method 400*b* can proceed to block 416 with instructing an additive manufacturing system to manufacture one or more appliances using the digital appliance representation(s), as described above in connection with FIG. 4A.

If the digital representation(s) do not satisfy some or all of the criteria, the method 400*b* can proceed to block 420 with evaluating whether any of the appliance design parameters can be modified (e.g., relaxed or omitted) to satisfy the criteria for direct additive manufacturing system, without significantly compromising the clinical goals of the treatment plan. Certain types of modifications may be preferred over others, e.g., it may be preferable to modify appliance design parameters that are less likely to result in print failure.

If the appliance design parameters can be modified, the method 400*b* can continue to block 422 with modifying the appliance parameters, then to block 424 with using the modified appliance design parameters as the appliance design parameters in block 408. The processes of blocks 408-418 can then be repeated to evaluate whether the modified parameters can be used to produce digital appliance representation(s) that are suitable for direct additive manufacturing.

If the appliance design parameters cannot be modified, the method 400*b* can instead proceed to block 426 with obtaining one or more 3D models of the patient's dentition. The 3D models can depict the dentition in positions corresponding to the treatment stages of the treatment plan. At block 428, the method 400*b* can include instructing an additive manufacturing system to manufacture molds using the 3D models. At block 430, the method 400*b* can continue with instructing a thermoforming machine to make one or more appliances using the molds. Accordingly, a dental appliance that cannot be rendered suitable for direct additive manufacturing can still be fabricated using thermoforming.

Figure 5:
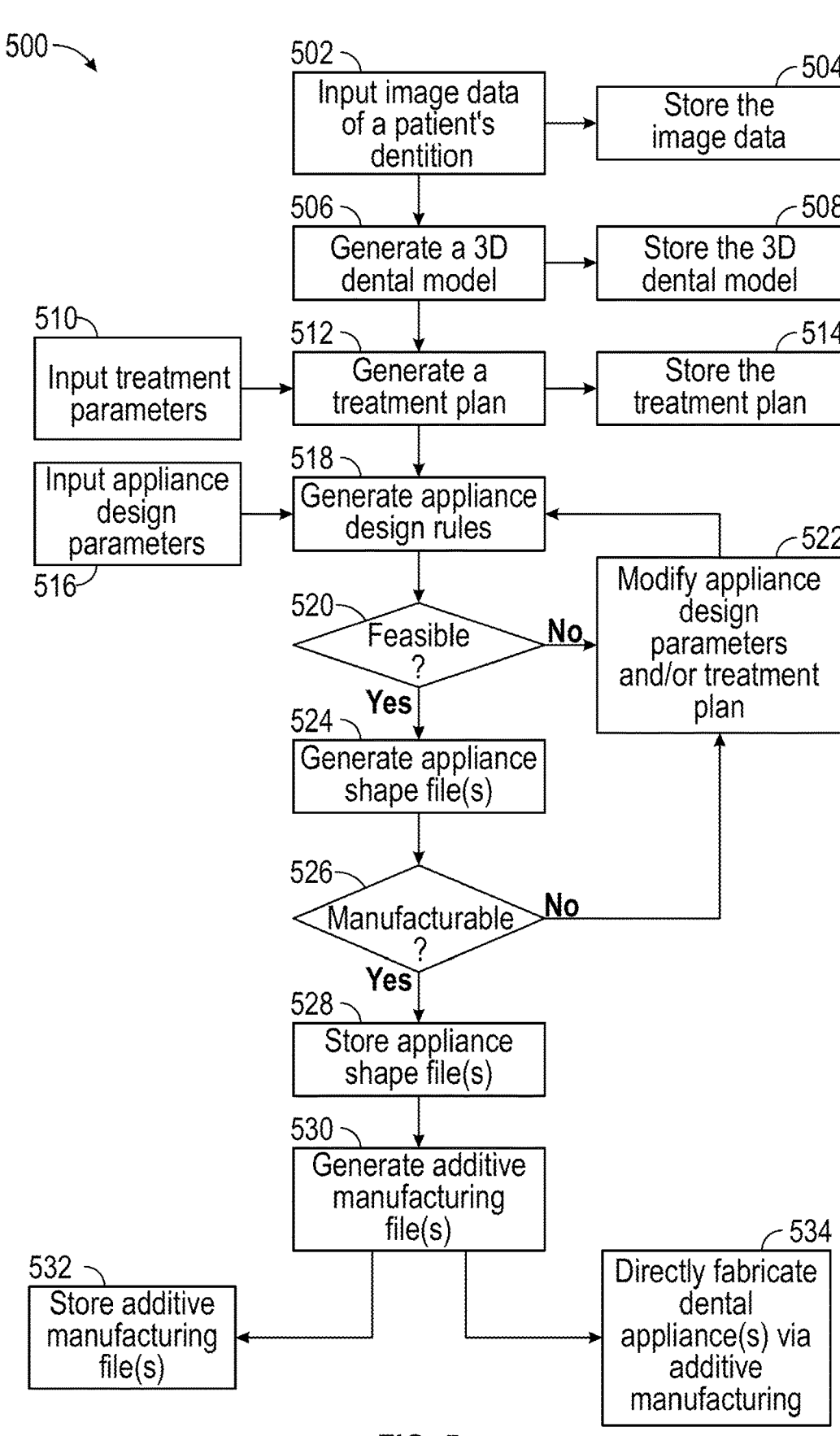
FIG. 5 is a flow diagram illustrating a method for treatment planning and appliance design, in accordance with embodiments of the present technology.

FIG. 5 is a flow diagram illustrating a method 500 for treatment planning and appliance design, in accordance with embodiments of the present technology. The method 500 begins at block 502 with inputting image data of a patient's dentition. The image data can be obtained using one or more imaging modalities, such as photographs, videos, scan data, MRI data, radiographic data, and/or motion data, and can include 2D data, 3D data, 4D data, or suitable combinations thereof, as previously described with respect to FIG. 1A. At block 504, the image data can be stored (e.g., in a datastore of the dental imaging system 106 and/or a datastore of any of the treatment management systems 108 of FIG. 1A).

At block 506, the method 500 can include generating a 3D dental model based on the image data. The 3D dental model can be a digital representation of the patient's teeth in an initial arrangement before the start of a treatment plan, an intermediate arrangement after treatment has commenced, or a final arrangement after the treatment has been completed, as previously described with respect to FIG. 1A. At block 508, the 3D dental model can be stored (e.g., in a datastore of the dental imaging system 106 and/or a datastore of any of the treatment management systems 108 of FIG. 1A).

At block 510, the method 500 can continue with inputting treatment parameters. The treatment parameters can include various types of information relevant to the patient's case, such as the treatment prescription, tooth information, movement information, treatment protocols for specific types of malocclusions, staging for treatment procedures, desired appliance features, constraints, modifications, etc., as described above in connection with FIG. 1A. In some embodiments, the treatment parameters are input by a clinician into the clinician system 110 of FIG. 1A.

At block 512, the method 500 can include generating a treatment plan based on the 3D dental model and/or treatment parameters. The treatment plan can specify a target arrangement for the teeth (e.g., a final tooth position for each of the teeth), and a plurality of treatment stages to move the teeth from an initial arrangement toward the target arrangement. In some embodiments, the 3D dental model is used to determine a target tooth arrangement and a plurality of intermediate arrangements to achieve the treatment goals specified by the treatment parameters. The treatment planning process can be performed by the treatment planning system 112 of FIG. 1A. At block 514, the treatment plan can be stored, such as in a datastore of the treatment planning system 112 of FIG. 1A.

At block 516, the method 500 can include inputting appliance design parameters. The appliance design parameters can include manufacturability parameters, efficacy parameters, and/or force system parameters, as described elsewhere herein. The appliance design parameters can be provided by a user, retrieved from a datastore (e.g., the appliance parameter datastore 140 of FIG. 1D), or suitable combinations thereof. The appliance design parameters can be identified based on the direct fabrication process to be used to manufacture the appliances for implementing the treatment plan, the type of appliances for implementing the treatment plan, the type of material to be used for the appliances, and/or the clinical goals of the treatment plan, as previously described with respect to block 304 of FIG. 3A.

At block 518, the method 500 can continue with generating appliance design rules based on the appliance design parameters. In some embodiments, the appliance design rules are configured to implement the constraints, adjustments, clinical considerations, etc., specified by the appliance design parameters, as described above with respect to block 410 of FIG. 4A. Alternatively or in combination, the process of block 518 can involve retrieving predetermined appliance design rules, as described in block 410 of FIG. 4A.

At block 520, the method 500 can include evaluating whether the appliance design rules are feasible for producing a directly fabricated appliance. The rules may not be feasible, for example, if some of the rules conflict with each other or are otherwise inconsistent with each other. If the rules are not feasible, the method 500 can proceed to block 522 with modifying the appliance design parameters and/or treatment plan. For instance, certain appliance design parameters can be relaxed or omitted if it is too difficult to produce an appliance design that complies with that parameter, while other appliance design parameters may be strict parameters that cannot be compromised under any circumstances. Certain types of modifications may be prioritized over others. In some embodiments, for example, it may be preferable to relax or omit one or more appliance design parameters, before modifying the treatment plan. In other embodiments, it may be preferable to alter one or more treatment parameters of the treatment plan, before modifying the appliance design parameters. The modified appliance design parameters and/or treatment plan can then be used to generate revised appliance design rules (block 518), which can be reevaluated for feasibility at block 520.

If the rules are feasible, the method 500 can proceed to block 524 with generating one or more appliance shape files. The shape files can provide digital representations (e.g., surface models, mesh models) of the 3D appliance geometry, and can be CAD files, STL files, OBJ files, AMF files, 3MF files, etc. In some embodiments, the process of block 524 involves using a rule-based algorithm to determine the appliance shapes for the appliance shape files, as described above in connection with block 306 of FIG. 3A and block 412 of FIG. 4A. The rule-based algorithm can implement some or all the appliance design rules from block 518. Rules may be applied sequentially, concurrently, or suitable combinations thereof. Certain rules may be weighted more heavily than or otherwise prioritized over other rules. For instance, rules that would result in print failure if violated may be prioritized over rules that would still produce a printable design.

At block 526, the method 500 can include evaluating whether the appliance shape(s) specified in the appliance shape file(s) are feasible for direct additive manufacturing. The process of block 526 can be identical or generally similar to the process of block 310 of FIG. 3B and/or block 418 of FIG. 4B. For example, the process of block 526 can involve analyzing the appliance shapes for manufacturability and/or geometry issues, such as mesh quality, self-intersections, discontinuities, holes, spikes, artifacts, and the like. The process of block 526 can also check for clinical issues, such as whether the appliance shapes conform to engineering specifications. Alternatively or in combination, the process of block 526 can evaluate whether the appliance shapes comply with one or more of the appliance design rules from block 518.

If the appliance shapes are not feasible for direct additive manufacturing, the method 500 can return to block 522 with modifying the appliance design parameters and/or treatment plan, then repeating the processes of blocks 518-526 until a manufacturable appliance shape is generated. Subsequently, the method 500 can proceed to block 528 with storing the appliance shape file(s) (e.g., in a datastore of the appliance design system 114 of FIG. 1A).

At block 530, the method 500 can include generating one or more additive manufacturing files, based on the appliance shape file(s). The additive manufacturing file(s) can provide instructions configured to control an additive manufacturing system in fabricating appliances having the specified appliance shapes. The additive manufacturing file(s) can also include other manufacturing parameters, such as part layout, part orientation, slicing, and/or support structures. In some embodiments, the additive manufacturing file(s) are toolpath files (e.g., G-code files) generated from the appliance shape file(s). At block 532, the additive manufacturing file(s) can be stored (e.g., in a datastore of the appliance design system 114 and/or in a datastore of the direct fabrication system 118 of FIG. 1A). At block 534, the method 500 can include directly fabricating one or more dental appliances via additive manufacturing, using the additive manufacturing file(s). The additive manufacturing can be performed by the direct fabrication system 118 of FIG. 1A.

Figure 6A:
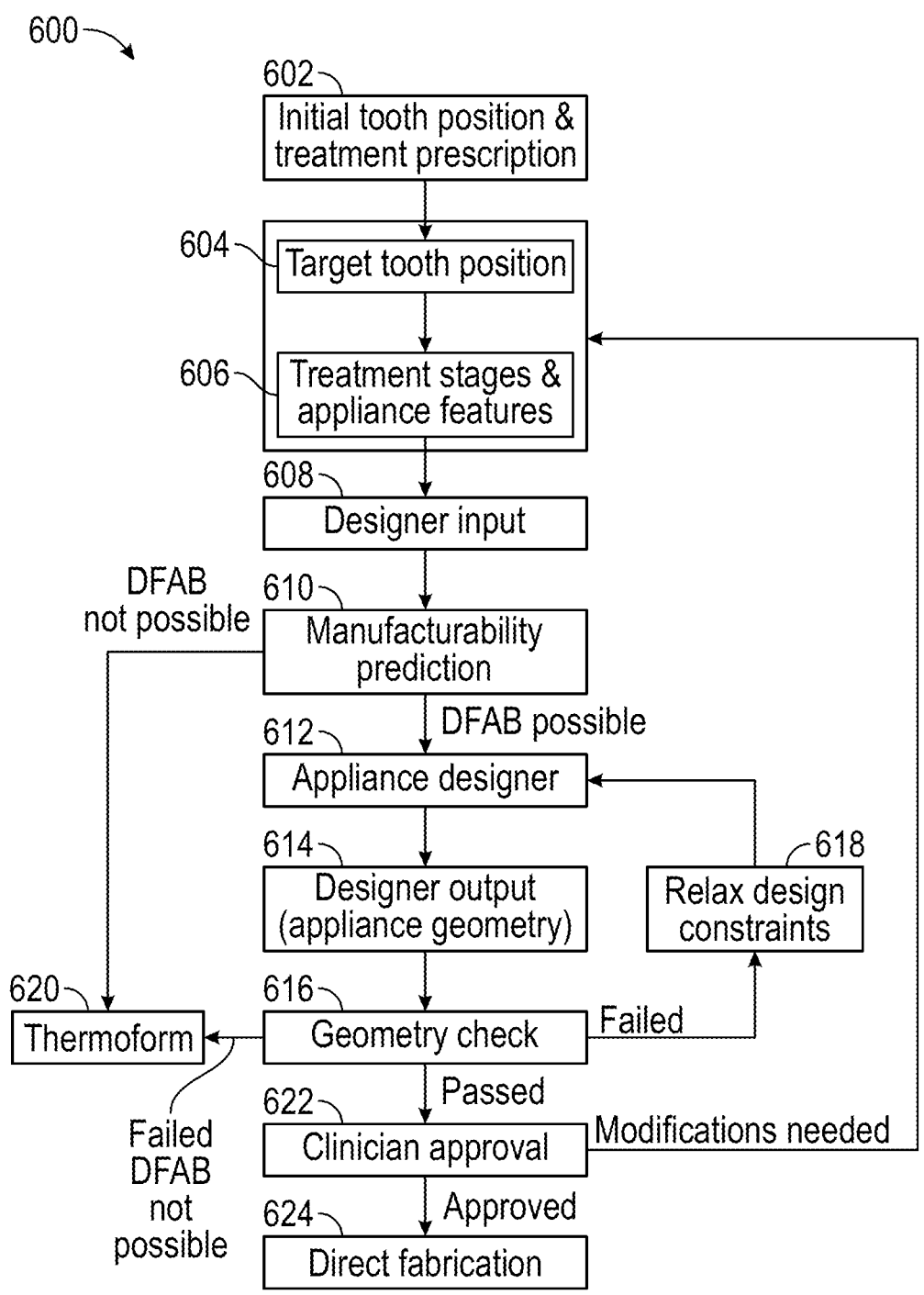
FIG. 6A is a flow diagram illustrating a method for treatment planning and appliance design, in accordance with embodiments of the present technology.
Figure 6B:
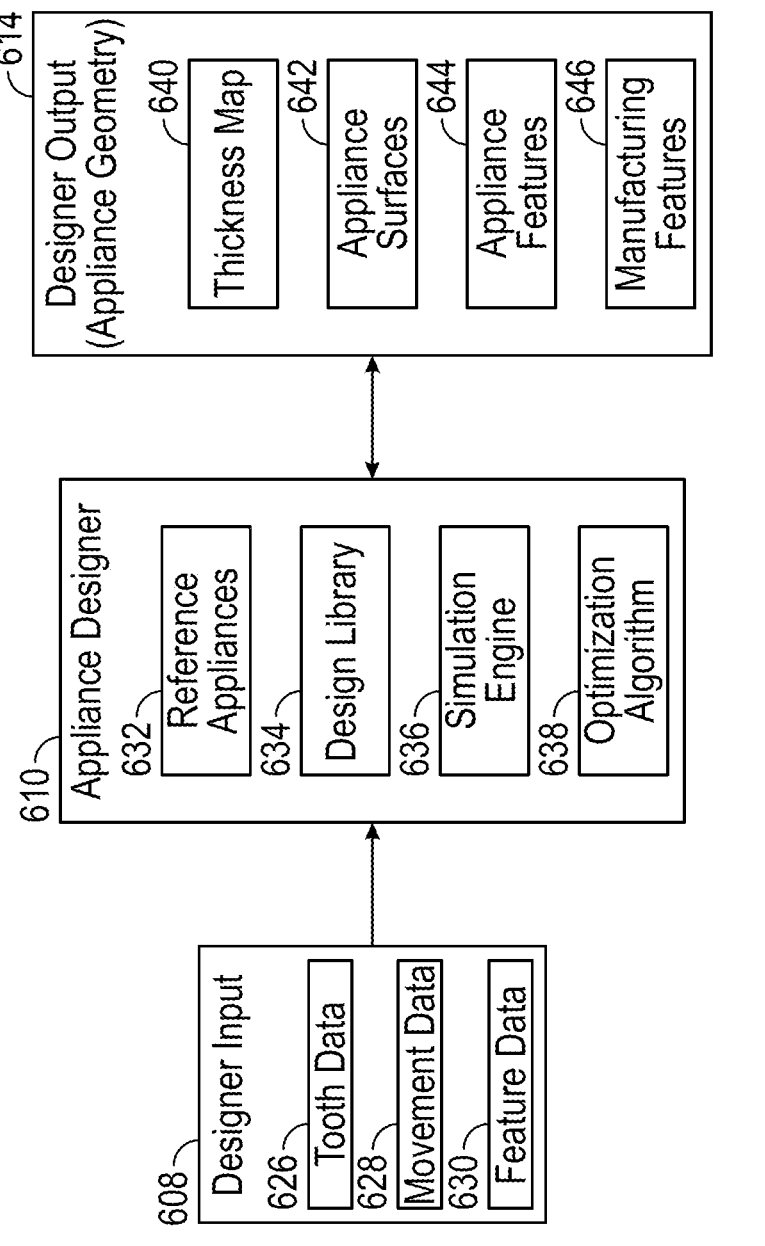
FIG. 6B is a flow diagram illustrating specific processes of the method of FIG. 6A.

FIGS. 6A and 6B are a flow diagrams illustrating a method 600 for treatment planning and appliance design, in accordance with embodiments of the present technology. Referring first to FIG. 6A, the method 600 can begin at block 602 with receiving a digital representation of an initial position of a patient's dentition, along with a treatment prescription for the patient's dentition. The digital representation can be or include image data of the patient's dentition, such as photographs, videos, scan data, MRI data, radiographic data, and/or motion data, and can include 2D data, 3D data, 4D data, or suitable combinations thereof, as previously described with respect to FIG. 1A. Alternatively or in combination, the digital representation can be or include a 3D dental model of the patient's dentition in the initial position, which can be generated based on the image data as described above in FIG. 1A. The treatment prescription can specify one or more clinical goals for the patient's dentition, such as desired tooth positions and/or treatment procedures for treating specific types of malocclusions (e.g., IPR).

At block 604, the method 600 can include determining a target position for the patient's dentition. At block 606, the method 600 can include generating a plurality of treatment stages of a treatment plan to reposition the patient's teeth from the initial tooth position toward the target tooth position, and, optionally, a set of appliance features that may be incorporated into or used with one or more dental appliances for implementing the treatment plan. The processes of blocks 604 and 606 can be performed using any of the treatment planning techniques described elsewhere herein. For instance, the target tooth position, treatment stages, and/or appliance features can be determined based on a set of treatment parameters specified by a clinician.

At block 606, the method 600 can continue with using the target tooth position, treatment stages, and appliance features to determine inputs to an appliance designer algorithm. As shown in FIG. 6B, the designer inputs can include any of the following: tooth data 626 specifying which teeth should be treated and/or the geometry of the teeth to be treated; movement data 628 specifying the movement direction, movement velocity, and/or movement types (e.g., distalization, root control compound movement) for each tooth to be treated; and/or feature data 630 specifying geometries, locations, and/or other characteristics of appliance features to be used (e.g., attachments, attachment receptacles, tooth-contacting regions, non-tooth-contacting-regions, activations, bite ramps, mandibular advancement wings, cutlines).

Referring again to FIG. 6A, at block 610, the designer inputs can optionally be analyzed by a manufacturability prediction algorithm that predicts whether it is possible to manufacture a dental appliance that satisfies the parameters specified by the inputs using a direct fabrication technique. The manufacturability prediction algorithm can use simulations (e.g., finite element analysis), comparison with pre-defined criteria, modeling, historical data, clinical data, rule-based approaches, machine learning approaches, and/or any other suitable technique to evaluate manufacturability. If the manufacturability prediction algorithm indicates that it is not possible (or highly impractical) to directly fabricate the appliance ("DFAB not possible"), the method 600 can proceed to block 620 with designing and fabricating the appliance using a thermoforming process instead.

If the manufacturability prediction algorithm indicates that it is possible and/or reasonably feasible to directly fabricate the appliance ("DFAB possible"), the method 600 can proceed to block 612 with providing the input to an appliance designer algorithm that determines the geometry of the dental appliance. As shown in FIG. 6B, the appliance designer algorithm can implement one or more techniques to generate the appliance geometry. For example, the appliance designer algorithm can use the geometry of a reference appliance 632 as the initial geometry for the dental appliance, then can adjust the initial geometry according to the designer inputs to produce a customized geometry for the dental appliance. The reference appliance 632 can be a previous dental appliance that have been successfully directly fabricated. In some embodiments, the reference appliance 632 is configured to treat similar teeth, produce similar tooth movements, and/or includes similar appliance features as the dental appliance.

As another example, the appliance designer algorithm can use information from a design library 634 to determine the appliance geometry. The design library 634 can include lookup tables, lists, databases, and/or other data structures storing information on how to design an appliance to achieve particular tooth movements while maintaining manufacturability. In some embodiments, the design library 634 stores thickness profiles for discrete appliance regions or for an entire appliance, with each thickness profile being correlated to a particular set of achieved tooth movements. Optionally, the design library 634 can store different configurations of appliance features, with each configuration being correlated to a particular set of tooth movements. The information in the design library 634 can be determined from experimental data and/or clinical data of existing appliances, simulations, or combinations thereof, and can be used to generate the appliance geometry via a heuristic approach.

In a further example, the appliance designer algorithm can use a simulation engine 636 to determine the appliance geometry. The simulation engine 636 can use any suitable approach for simulating the behavior of a dental appliance, such as finite element modeling, reduced-order modeling, or combinations thereof. The simulation engine 636 can analyze forces and/or torques applied to teeth and the resulting tooth movements. In some embodiments, the appliance designer algorithm implements an iterative process in which an initial appliance geometry is generated, then analyzed by the simulation engine 636 to assess the appliance behavior. Based on the simulation results, the initial appliance geometry can be modified and/or optimized until the desired behavior is achieved (e.g., the appliance produces the desired tooth movements).

In yet another example, the appliance designer algorithm can use an optimization algorithm 638 to determine the appliance geometry. The optimization algorithm 638 can be a rule-based algorithm that implements one or more appliance design rules to produce the appliance geometry, as described elsewhere herein. Alternatively or in combination, one or more appliance design rules can be used to define a loss function for the optimization algorithm 638. In some embodiments, the optimization algorithm 638 uses non-parametric optimization (e.g., topological optimization) to iteratively modify an initial appliance geometry until desired results are achieved (e.g., the appliance produces the desired tooth movements).

In some embodiments, the appliance designer algorithm incorporates one or more design constraints when determining the appliance geometry using any of the techniques described herein. The design constraints can include constraints on the appliance geometry, such as a minimum feature size, a maximum feature size, a minimum appliance thickness, a maximum appliance thickness, a maximum overhang size, a maximum overhang angle, and/or a maximum bridge size. The design constraints can be based on capabilities and/or limitations of the direct fabrication process, such as a resolution of the direct fabrication process, an amount of overcuring that is expected to occur in the direct fabrication process, a property of a material used in the direct fabrication process, an overhang size limit of the direct fabrication process, an overhang angle limit of the direct fabrication process, a bridge size limit of the direct fabrication process, and/or post-processing conditions.

Referring again to FIG. 6A, at block 614, the appliance designer algorithm can output an appliance geometry for a dental appliance. As shown in FIG. 6B, the designer output can include a thickness map 640 that shows the distribution of thicknesses across the entire appliance (e.g., a thickness distribution of the appliance shell with teeth-receiving cavities). The designer output can also include digital representations of one or more appliance surfaces 642, such as the internal surfaces of the shell defining the teeth-receiving cavities and/or external surfaces of the shell. The designer output can include digital representations of one or more appliance features 644, such as attachments, attachment receptacles, appliance regions that contact the teeth (e.g., contact points, pressure points, power ridges), appliance regions that avoid contact with the teeth (e.g., bubbles, virtual fillers to provide clearance at interproximal regions), activations, bite ramps, and/or cutlines. Optionally, the designer output can include digital representations of one or more manufacturing features 646. The manufacturing features 646 can be components that are incorporated into or coupled to the appliance to facilitate manufacturing, and can include support structures (e.g., to support the appliance during additive manufacturing), identifiers for the appliance (e.g., embossed markings, QR codes, bar codes), and so on.

Referring again to FIG. 6A, at block 616, the method 600 can include performing a quality check of the appliance geometry. This process can include checking for manufacturability and/or geometry issues, such as mesh quality, self-intersections, discontinuities, holes, spikes, and/or artifacts; comparing the appliance geometry with safety limits (e.g., stiffness limits, force and/or torque limits); checking the appliance geometry for compliance with design constraints; and/or checking for manufacturing features (e.g., whether sufficient support structures are present, whether the identifiers are present and correct). The quality check can alternatively or additionally be based on other considerations, such as clinician preferences, patient preferences, optimization parameters, etc.

If the appliance geometry fails the quality check, the method 600 can proceed to block 618 with relaxing one or more design constraints, such as by modifying or omitting one or more design constraints. The design constraints can include constraints on the appliance geometry, such as a minimum feature size, a maximum feature size, a minimum appliance thickness, a maximum appliance thickness, a maximum overhang size, a maximum overhang angle, and/or a maximum bridge size. The design constraints can be based on capabilities and/or limitations of the direct fabrication process, such as a resolution of the direct fabrication process, an amount of overcuring that is expected to occur in the direct fabrication process, a property of a material used in the direct fabrication process, an overhang size limit of the direct fabrication process, an overhang angle limit of the direct fabrication process, a bridge size limit of the direct fabrication process, and/or post-processing conditions. Certain design constraints may be relaxed before other design constraints. For instance, design constraints that have a higher likelihood of producing a printable design even if modified or omitted can be relaxed before design constraints that have a higher likelihood of resulting in print failure if modified or omitted. Certain design constraints may be strict constraints that cannot be relaxed under any circumstances. After the design constraints have been modified, the method 600 can return to blocks 612 and 614 with generating a revised appliance geometry using the appliance designer algorithm, then reevaluating the revised appliance geometry in block 616.

In some embodiments, if the appliance geometry fails the quality check and it is not possible to relax any design constraints, the method 600 can instead proceed to block 620 with fabricating the dental appliance via a thermoforming process. The method 600 can also revert to the thermoforming process if the appliance geometry continues to fail the quality check after multiple iterations of relaxing design constraints and revisions.

If the appliance geometry passes the quality check, the method 600 can optionally proceed to block 622 with sending the appliance geometry to the clinician for review and approval. If the clinician approves the appliance geometry, the method 600 can then proceed to block 624 with sending instructions to a fabrication system to manufacture a dental appliance having the appliance geometry via direct fabrication. If the clinician determines that modifications to the appliance geometry are appropriate, the clinician can provide feedback to modify the appliance geometry directly. Alternatively or in combination, the clinician can provide feedback to modify the target tooth position, treatment stages, and/or appliance features that were used as input to the appliance designer. In either case, the modifications can be used to produce a revised appliance geometry that can be checked and then presented to the clinician for approval. In other embodiments, however, the clinician approval process of block 622 can be omitted, such that once the appliance geometry passes the quality check of block 616, the method 600 proceeds to block 624 to directly fabricate the corresponding dental appliance.

II. Dental Appliances and Associated Methods

Figure 7A:
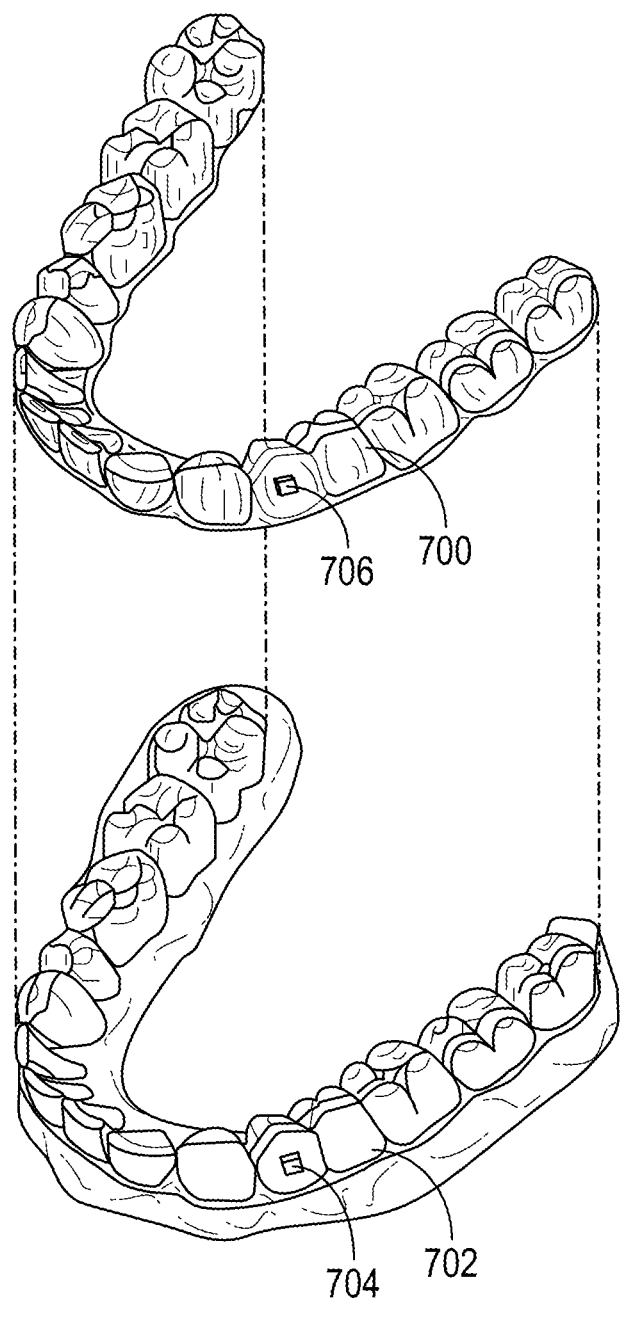
FIG. 7A illustrates a representative example of a tooth repositioning appliance configured in accordance with embodiments of the present technology.

FIG. 7A illustrates a representative example of a tooth repositioning appliance 700 configured in accordance with embodiments of the present technology. The appliance 700 can be manufactured and post-processed using any of the systems, methods, and devices described herein. The appliance 700 (also referred to herein as an "aligner") can be worn by a patient in order to achieve an incremental repositioning of individual teeth 702 in the jaw. The appliance 700 can include a shell (e.g., a continuous polymeric shell or a segmented shell) having teeth-receiving cavities that receive and resiliently reposition the teeth. The appliance 700 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 700 can fit over all teeth present in an upper or lower jaw, or less than all of the teeth. The appliance 700 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 700 can be a generic appliance configured to receive the teeth, but not necessarily shaped to match the topography of the patient's teeth. In some cases, only certain teeth received by the appliance 700 are repositioned by the appliance 700 while other teeth can provide a base or anchor region for holding the appliance 700 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 700 in place over the teeth. In some cases, however, it may be desirable or necessary to provide individual attachments 704 or other anchoring elements on teeth 702 with corresponding receptacles 706 or apertures in the appliance 700 so that the appliance 700 can apply a selected force on the tooth. Representative examples of appliances, including those utilized in the Invisalign® System, are described in numerous patents and patent applications assigned to Align Technology, Inc. including, for example, in U.S. Pat. Nos. 6,450, 807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
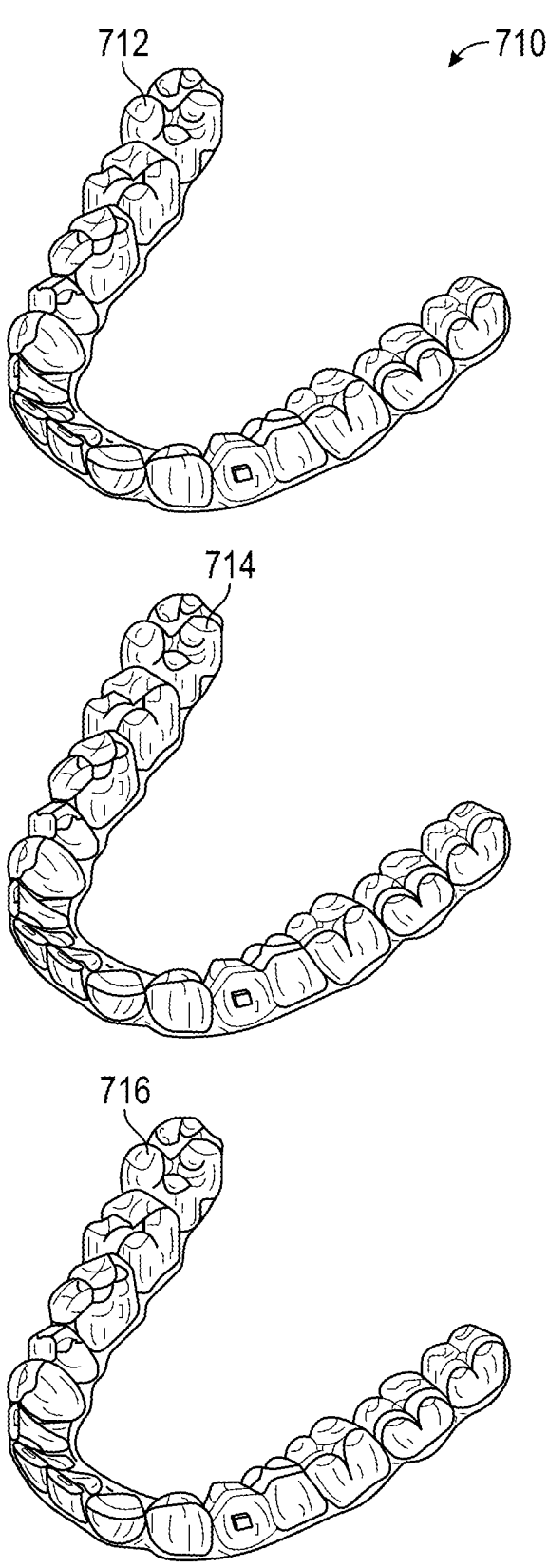
FIG. 7B illustrates a tooth repositioning system including a plurality of appliances, in accordance with embodiments of the present technology.

FIG. 7B illustrates a tooth repositioning system 710 including a plurality of appliances 712, 714, 716, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIG. 7C illustrates a method 720 of orthodontic treatment using a plurality of appliances, in accordance with embodiments of the present technology. The method 720 can be practiced using any of the appliances or appliance sets described herein. In block 722, a first orthodontic appliance is applied to a patient's teeth in order to reposition the teeth from a first tooth arrangement to a second tooth arrangement. In block 724, a second orthodontic appliance is applied to the patient's teeth in order to reposition the teeth from the second tooth arrangement to a third tooth arrangement. The method 720 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 8 illustrates a method 800 for designing an orthodontic appliance, in accordance with embodiments of the present technology. The method 800 can be applied to any embodiment of the orthodontic appliances described herein. Some or all of the steps of the method 800 can be performed by any suitable data processing system or device, e.g., one or more processors configured with suitable instructions.

In block 802, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 804, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 804 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 806, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systémes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 808, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 800 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 800 may be performed with any suitable fabrication system or device, such as the embodiments described herein. Some of the steps may be optional, e.g., the process of block 804 may be omitted, such that the orthodontic appliance is designed based on the desired tooth movements and/or determined tooth movement path, rather than based on a force system. Moreover, the order of the steps can be varied as desired.

FIG. 9 illustrates a method 900 for digitally planning an orthodontic treatment and/or design or fabrication of an appliance, in accordance with embodiments. The method 900 can be applied to any of the treatment procedures described herein and can be performed by any suitable data processing system.

In block 902, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 904, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 906, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., including receiving a digital representation of the patient's teeth (block 902)), followed by design and/or fabrication of an orthodontic appliance based on a representation of the patient's teeth in the arrangement represented by the received representation.

Figures 10, 11:
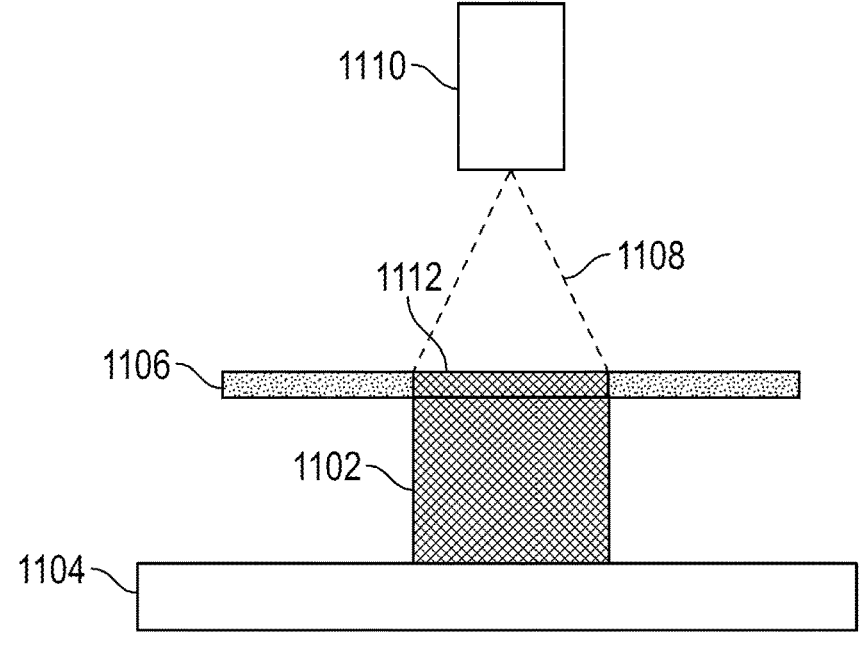
FIG. 10 illustrates a method for generating and administering treatment, in accordance with embodiments of the present technology.
FIG. 11 is a partially schematic diagram providing a general overview of an additive manufacturing process, in accordance with embodiments of the present technology.

FIG. 10 illustrates a method 1000 for generating and administering treatment, in accordance with embodiments of the present technology. The method 1000 begins at block 1002 with receiving information regarding the orthodontic condition of a patient and/or treatment information. The process of block 1002 can include obtaining data representing an initial arrangement of the patient's teeth, which typically includes obtaining an impression or scan of the patient's teeth prior to the onset of treatment, and can further include identification of one or more treatment goals selected by the practitioner and/or patient.

At block 1004, a case assessment can be generated so as to assess the complexity or difficulty of moving the particular patient's teeth, in general or specifically corresponding to identified treatment goals, and can further account for the practitioner's experience and/or comfort level in administering the desired orthodontic treatment. In some embodiments, however, the assessment can include simply identifying particular treatment options (e.g., appointment planning, progress tracking, etc.) that are of interest to the patient and/or practitioner.

At block 1006, a treatment plan for repositioning the patient's teeth is generated. The treatment plan can include a final or target arrangement of the patient's teeth that is desired, as well as a plurality of planned successive or intermediate tooth arrangements for moving the teeth along a treatment path from the initial arrangement toward the selected final or target arrangement.

At block 1008, the method further includes generating customized treatment guidelines. In some embodiments, the treatment plan includes multiple phases of treatment, with a customized set of treatment guidelines generated that correspond to a phase of the treatment plan. The guidelines can include detailed information on timing and/or content (e.g., specific tasks) to be completed during a given phase of treatment, and can provide sufficient detail to guide a practitioner, including a less experienced practitioner or practitioner relatively new to the particular orthodontic treatment process, through the phase of treatment. The guidelines can be customized, in that the guidelines are designed to specifically correspond to the treatment plan and provide guidelines on activities specifically identified in the treatment information and/or generated treatment plan. The customized treatment guidelines can be provided to the practitioner so as to help instruct the practitioner on how to deliver a given phase of treatment.

At block 1010, appliances can be generated based on the planned arrangements and can be provided to the practitioner and ultimately administered to the patient. The appliances can typically be provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

At block 1012, treatment progress tracking can be performed, after the treatment according to the plan begins and following administration of appliances to the patient. Treatment progress tracking (e.g., by teeth matching) can be done to assess a current and actual arrangement of the patient's teeth compared to a planned arrangement. If the patient's teeth are determined to be "on-track" and progressing according to the treatment plan, then the treatment can be considered to be progressing as planned and can continue to the next stage of treatment.

At block 1014, if the patient's teeth have substantially reached the initially planned final arrangement, then treatment can progress to the final stages. If the patient's teeth are determined to be progressing properly according to the treatment plan, but have not yet reached the final arrangement, the next set of appliances can be administered to the patient.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement templates, e.g., appliances used to position prefabricated attachments on a person's teeth in accordance with one or more aspects of a treatment plan. An attachment placement template can include a plurality of registration elements that each have at least one surface shaped to conform to one or more contours of an exterior surface of a tooth. The attachment placement template can also include at least one attachment support configured to position an attachment against a tooth. The attachment support can be coupled to a respective registration element, and can include the attachment, a frame extending around the attachment, and one or more struts connecting the attachment to the frame. In some embodiments, the registration elements are shaped to receive corresponding teeth of the dental arch to retain the attachment placement template in a predetermined position with respect to the dental arch and align the attachment to its intended position and orientation on the tooth surface. The attachment can then be secured to the tooth using bonding, adhesives, etc. The struts can then be cut, broken, or otherwise released to allow the attachment placement template to be removed while the attachment remains on the tooth. Examples of attachment placement templates (also known as "attachment placement devices" or "attachment fabrication templates") can be found at least in: U.S. application Ser. No. 17/549,460, entitled, "Replacement Attachment System," filed Dec. 13, 2021; U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103,330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,700,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. An incremental palatal expander can include a first tooth engagement region, a second tooth engagement region, and a palatal region connecting the first and second tooth engagement regions and configured to apply a lateral force between the first tooth engagement region and the second tooth engagement region. For instance, the first and second tooth engagement regions can be molar regions (which may also be configured to include premolars), each with one or more cavities that respectively fit over one of the patient's molars (and/or premolars). The palatal region can separate the tooth engagement regions and can fit against the patient's palate. The palatal region can provide force to stretch or expand the mid-palatal region, and can include springs, thermally active materials), struts, supports, cross-beams, ribs, gaps, windows, attachments, etc. Examples of incremental palatal expanders can be found at least in: U.S. application Ser. No. 16/380,801, entitled, "Releasable Palatal Expanders," filed Apr. 10, 2019; U.S. application Ser. No. 16/022,552, entitled, "Devices, Systems, and Methods for Dental Arch Expansion," filed Jun. 28, 2018; U.S. Pat. No. 11,045,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

III. Additive Manufacturing Technology

The systems, methods, and devices described herein are suitable for use with a wide variety of additive manufacturing techniques. Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using vat photopolymerization process in which light is used to selectively cure a vat or other bulk source of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase the reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Pat. No. 10,162,264 and U.S. Patent Publication No. 2014/0061974, the disclosures of which are incorporated herein by reference in their entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

FIG. 11 is a partially schematic diagram providing a general overview of an additive manufacturing process, in accordance with embodiments of the present technology. In the illustrated embodiment, an object 1102 is fabricated on a build platform 1104 (e.g., a print bed, tray, plate, film, sheet, or other planar substrate) from a series of cured material layers, with each layer having a geometry corresponding to a respective cross-section of the object 1102. To fabricate an individual object layer, a layer of curable material 1106 (e.g., polymerizable resin) is brought into contact with the build platform 1104 (when fabricating the first layer of the object 1102) or with the previously formed portion of the object 1102 on the build platform 1104 (when fabricating subsequent layers of the object 1102). In some embodiments, the curable material 1106 is formed on and supported by a substrate (not shown), such as a film. Energy 1108 (e.g., light) from an energy source 1110 (e.g., a projector or light engine) is then applied to the curable material 1106 to form a cured material layer 1112 on the build platform 1104 or on the object 1102. The remaining curable material 1106 can then be moved away from the build platform 1104 (e.g., by lowering the build platform 1104, by raising the curable material 1106, and/or by moving the curable material 1106 laterally), thus leaving the cured material layer 1112 in place on the build platform 1104 and/or object 1102. The fabrication process can then be repeated with a fresh layer of curable material 1106 to build up the next layer of the object 1102.

The illustrated embodiment shows a "top down" configuration in which the energy source 1110 is positioned above and directs the energy 1108 down toward the build platform 1104, such that the object 1102 is formed on the upper surface of the build platform 1104. Accordingly, the build platform 1104 can be incrementally lowered relative to the energy source 1110 as successive layers of the object 1102 are formed. In other embodiments, however, the additive manufacturing process of FIG. 11 can be performed using a "bottom up" configuration in which the energy source 1110 is positioned below and directs the energy 1108 up toward the build platform 1104, such that the object 1102 is formed on the lower surface of the build platform 1104. Accordingly, the build platform 1104 can be incrementally raised relative to the energy source 1110 as successive layers of the object 1102 are formed.

Although FIG. 11 illustrates a representative example of an additive manufacturing process, this is not intended to be limiting, and the embodiments described herein can be adapted to other types of additive manufacturing systems (e.g., vat-based systems) and/or other types of additive manufacturing processes (e.g., material jetting, binder jetting, FDM, powder bed fusion, sheet lamination, directed energy deposition).

EXAMPLES

The following examples are included to further describe some aspects of the present technology, and should not be used to limit the scope of the technology.

Example 1. A method comprising:

receiving a treatment plan for a patient's teeth, the treatment plan specifying a target arrangement for the teeth and a plurality of treatment stages to reposition the teeth from an initial arrangement toward the target arrangement;

identifying appliance design parameters for one or more dental appliances to implement the treatment plan, wherein the appliance design parameters comprise one or more manufacturability parameters corresponding to an additive manufacturing process to be used to directly fabricate the one or more dental appliances;

determining an appliance geometry for the one or more dental appliances based on the appliance design parameters; and generating instructions for fabricating the one or more dental appliances with the determined appliance geometry using the additive manufacturing process.

Example 2. The method of Example 1, wherein the one or more manufacturability parameters comprise at least one constraint on the appliance geometry that is configured to improve manufacturability of the one or more dental appliances.

Example 3. The method of Example 2, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

Example 4. The method of Example 2 or 3, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

Example 5. The method of any one of Examples 1 to 4, wherein the one or more manufacturability parameters comprise at least one adjustment to the appliance geometry that is configured to improve manufacturability of the one or more dental appliances.

Example 6. The method of Example 5, wherein the at least one adjustment comprises one or more of the following: increasing a feature size, decreasing a feature size, changing a feature location, increasing an appliance thickness, decreasing an appliance thickness, changing an appliance orientation, or adding a support structure.

Example 7. The method of Example 5 or 6, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the one or more dental appliances, or an expected change in a property of the one or more dental appliances after the post-processing technique is used.

Example 8. The method of any one of Examples 1 to 7, further comprising performing a quality check of the appliance geometry, wherein the quality check comprises evaluating whether the appliance geometry exhibits one or more manufacturability issues.

Example 9. The method of any one of Examples 1 to 8, further comprising performing a quality check of the appliance geometry, wherein the quality check comprises evaluating whether the appliance geometry complies with one or more safety constraints.

Example 10. The method of any one of Examples 1 to 9, wherein the one or more dental appliances comprise an aligner, a palatal expander, an attachment placement template, or a retainer.

Example 11. The method of any one of Examples 1 to 10, further comprising fabricating the one or more dental appliances with the determined appliance geometry using the additive manufacturing process.

Example 12. The method of Example 11, wherein the receiving, identifying, determining, and generating are performed by one or more processors.

Example 13. The method of Example 12, wherein the fabricating is performed by a device different from the one or more processors.

Example 14. A system comprising:
one or more processors; and
a memory operably coupled to the one or more processors and storing instructions that, when executed by the one or more processors, cause the system to perform operations comprising:
  receiving a treatment plan for a patient's teeth, the treatment plan specifying a target arrangement for the teeth and a plurality of treatment stages to reposition the teeth from an initial arrangement toward the target arrangement,
  identifying appliance design parameters for one or more dental appliances to implement the treatment plan, wherein the appliance design parameters comprise one or more manufacturability parameters corresponding to an additive manufacturing process to be used to directly fabricate the one or more dental appliances,
  determining an appliance geometry for the one or more dental appliances based on the appliance design parameters, and
  generating instructions for fabricating the one or more dental appliances with the determined appliance geometries using the additive manufacturing process.

Example 15. The system of Example 14, wherein the one or more manufacturability parameters comprise at least one constraint on the appliance geometry that is configured to improve manufacturability of the one or more dental appliances.

Example 16. The system of Example 15, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

Example 17. The system of Example 15 or 16, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

Example 18. The system of any one of Examples 14 to 17, wherein the one or more manufacturability parameters comprise at least one adjustment to the appliance geometry that is configured to improve manufacturability of the one or more dental appliances.

Example 19. The system of Example 18, wherein the at least one adjustment comprises one or more of the following: increasing a feature size, decreasing a feature size, changing a feature location, increasing an appliance thickness, decreasing an appliance thickness, changing an appliance orientation, or adding a support structure.

Example 20. The system of Example 18 or 19, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the one or more dental appliances, or an expected change in a property of the one or more dental appliances after the post-processing technique is used.

Example 21. The system of any one of Examples 14 to 20, wherein the operations further comprise performing a quality check of the appliance geometry, and wherein the quality check comprises evaluating whether the appliance geometry exhibits one or more manufacturability issues.

Example 22. The system of any one of Examples 14 to 21, wherein the operations further comprise performing a quality check of the appliance geometry, and wherein the quality check comprises evaluating whether the appliance geometry complies with one or more safety constraints.

Example 23. The system of any one of Examples 14 to 22, wherein the one or more dental appliances comprise an aligner, a palatal expander, an attachment placement template, or a retainer.

Example 24. A method comprising:
receiving a treatment plan for a patient's teeth, the treatment plan comprising a target arrangement for the teeth and a plurality of treatment stages configured to reposition the teeth from an initial arrangement toward the target arrangement;
identifying a set of appliance design parameters for a dental appliance configured to implement at least one treatment stage of the plurality of treatment stages, wherein the set of appliance design parameters comprises one or more manufacturability parameters corresponding to an additive manufacturing process to be used to directly fabricate the dental appliance; and
determining an appliance geometry for the dental appliance using the set of appliance design parameters.

Example 25. The method of Example 24, wherein the plurality of treatment stages comprise a plurality of intermediate arrangements for the teeth, and the dental appliance is configured to reposition the teeth to at least one intermediate arrangement of the plurality of intermediate arrangements.

Example 26. The method of Example 24 or 25, wherein the dental appliance comprises an aligner.

Example 27. The method of any one of Examples 24 to 26, wherein the appliance geometry comprises a thickness map of the dental appliance.

Example 28. The method of any one of Examples 24 to 27, wherein the one or more manufacturability parameters comprise at least one constraint on the appliance geometry that is configured to improve manufacturability of the dental appliance.

Example 29. The method of Example 28, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

Example 30. The method of Example 28 or 29, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

Example 31. The method of any one of Examples 24 to 30, wherein the one or more manufacturability parameters comprise at least one adjustment to the appliance geometry that is configured to improve manufacturability of the dental appliance.

Example 32. The method of Example 31, wherein the at least one adjustment comprises one or more of the following: increasing a feature size, decreasing a feature size, changing a feature location, increasing an appliance thickness, decreasing an appliance thickness, changing an appliance orientation, or adding a support structure.

Example 33. The method of Example 31 or 32, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the dental appliance, or an expected change in a property of the dental appliance after the post-processing technique is used.

Example 34. The method of any one of Examples 24 to 33, wherein the set of appliance design parameters comprise one or more efficacy parameters representing correspondences between appliance features and clinical goals.

Example 35. The method of Example 34, wherein:
the appliance features comprise one or more of the following: appliance thickness, appliance stiffness, surface geometry, feature type, feature size, feature shape, surface geometry attachment location, attachment geometry, or contact points, and
the clinical goals comprise one or more of the following: a tooth to be moved, a tooth movement type, a tooth movement direction, a tooth movement amount, a tooth movement velocity, a magnitude of a force to be applied to a tooth, a magnitude of a torque to be applied to a tooth, a direction of a force to be applied to a tooth, or a direction of a torque to be applied to a tooth.

Example 36. The method of any one of Examples 24 to 35, wherein the appliance geometry is determined using a rule-based algorithm, and wherein the rule-based algorithm implements a set of appliance design rules corresponding to the set of appliance design parameters.

Example 37. The method of Example 36, further comprising determining the set of appliance design rules based on the set of appliance design parameters.

Example 38. The method of Example 36 or 37, wherein the set of appliance design rules comprise rules related to one or more of the following: a minimum feature size, a maximum force threshold, permitted movement types, forbidden movement types, permitted geometries, forbidden geometries, a minimum thickness, or a maximum thickness.

Example 39. The method of any one of Examples 24 to 38, further comprising performing a quality check of the appliance geometry.

Example 40. The method of Example 39, wherein performing the quality check of the appliance geometry comprises evaluating whether the appliance geometry exhibits any manufacturability issues.

Example 41. The method of Example 40, wherein the manufacturability issues comprise one or more of the following: self-intersecting regions, discontinuities, holes, spikes, or artifacts.

Example 42. The method of any one of Examples 39 to 41, wherein performing the quality check of the appliance geometry comprises evaluating whether the appliance geometry complies with safety constraints.

Example 43. The method of Example 42, wherein the safety constraints comprise one or more of the following: a thickness limit, a stiffness limit, or a force limit.

Example 44. The method of any one of Examples 39 to 43, further comprising: if the appliance geometry does not pass the quality check, determining whether one or more of the appliance geometry, the set of appliance design parameters, or the treatment plan can be modified.

Example 45. The method of Example 44, further comprising: if the appliance geometry can be modified, modifying the appliance geometry, and performing a quality check of the modified appliance geometry.

Example 46. The method of Example 44 or 45, further comprising:
if at least one appliance design parameter of the set of appliance design parameters can be modified, modifying the at least one appliance design parameter,
determining a modified appliance geometry using the modified at least one design parameter, and
performing a quality check of the modified appliance geometry.

Example 47. The method of Example 46, wherein modifying the at least one design parameter comprises relaxing or omitting a constraint on the appliance geometry.

Example 48. The method of any one of Examples 44 to 47, further comprising:
if the treatment plan can be modified, modifying the treatment plan,
determining a modified appliance geometry based on the modified treatment plan, and
performing a quality check of the modified appliance geometry.

Example 49. The method of Example 48, wherein modifying the treatment plan comprises modifying one or more of: a tooth position, a direction of tooth movement, an amount of tooth movement, a direction of a force applied to a tooth, a magnitude of a force applied to a tooth, a number of treatment stages, or an attachment to be applied to a tooth.

Example 50. The method of any one of Examples 39 to 49, further comprising: if the appliance geometry does not pass the quality check after a predetermined number of iterations, generating instructions for indirect fabrication of the dental appliance via a thermoforming process.

Example 51. The method of any one of Examples 39 to 50, further comprising: if the appliance geometry passes the quality check, generating instructions for direct fabrication of the dental appliance having the appliance geometry via the additive manufacturing process.

Example 52. The method of any one of Examples 24 to 51, further comprising identifying a force system configured to produce at least one tooth movement according to the at least one treatment stage, wherein the appliance geometry is determined based at least in part on the force system.

Example 53. The method of Example 52, wherein the appliance geometry is configured to deliver the force system to the teeth.

Example 54. The method of Example 52 or 53, wherein the set of appliance design parameters comprise one or more of the following: a minimum force magnitude, a maximum force magnitude, a minimum torque magnitude, a maximum torque magnitude, a permissible force direction, an impermissible force direction, a permissible torque direction, or an impermissible torque direction.

Example 55. A method comprising:
receiving a treatment plan for a patient's teeth, the treatment plan comprising a target arrangement for the teeth and a plurality of treatment stages configured to reposition the teeth from an initial arrangement toward the target arrangement;
identifying a set of appliance design parameters for a plurality of appliances configured to implement the plurality of treatment stages of the treatment plan;
determining a set of appliance design rules for designing the plurality of appliances, based on the one or more appliance design parameters; and
generating at least one appliance geometry for at least one appliance of the plurality of appliances, using the one or more appliance design rules.

Example 56. The method of Example 55, wherein the one or more appliance design parameters comprise one or more of the following: tooth positions, tooth shapes, movement directions, movement velocities, force vectors, appliance features, attachments, or contact points.

Example 57. The method of Example 55 or 56, wherein the one or more appliance design rules include at least one constraint associated with an additive manufacturing process.

Example 58. The method of Example 57, wherein the one or more appliance design rules comprise rules related to one or more of the following: a minimum feature size, a maximum force threshold, permitted movement types, forbidden movement types, permitted geometries, forbidden geometries, a minimum thickness, or a maximum thickness.

Example 59. The method of any one of Examples 55 to 58, wherein the at least one appliance geometry is generated using a rule-based algorithm that implements the one or more appliance design rules.

Example 60. The method of any one of Examples 55 to 59, further comprising performing a quality check of the appliance geometry.

Example 61. The method of Example 60, wherein performing the quality check comprises determining whether the at least one appliance geometry is manufacturable via a direct fabrication process.

Example 62. The method of Example 61, wherein the direct fabrication process comprises an additive manufacturing process.

Example 63. The method of Example 61 or 62, wherein if the at least one appliance geometry is determined not to be manufacturable via the direct fabrication process, the method further comprises:
modifying the treatment plan, and
generating at least one revised appliance geometry based at least in part on the modified treatment plan.

Example 64. The method of any one of Examples 61 to 63, wherein if the at least one appliance geometry is determined not to be manufacturable via the direct fabrication process, the method further comprises:
modifying the one or more appliance design parameters, and
generating at least one revised appliance geometry based at least in part on the modified one or more appliance design parameters.

Example 65. The method of any one of Examples 61 to 64, wherein if the at least one appliance geometry is determined not to be manufacturable via the direct fabrication process, the method further comprises:
modifying the one or more appliance design rules, and
generating at least one revised appliance geometry based at least in part on the modified one or more appliance design rules.

Example 66. The method of any one of Examples 61 to 65, wherein if the at least one appliance geometry is determined not be manufacturable after a predetermined number of iterations, the method further comprises generating instructions for fabricating the at least appliance via an indirect fabrication process.

Example 67. The method of any one of Examples 55 to 66, further comprising generating instructions configured to cause a manufacturing system to fabricate the at least one appliance using a direct fabrication technique.

Example 68. The method of any one of Examples 55 to 67, further comprising identifying a force system configured to produce at least one tooth movement according to at least one treatment stage, wherein the at least one appliance geometry is generated based at least in part on the force system.

Example 69. The method of Example 68, wherein the appliance geometry is configured to deliver the force system to the teeth.

Example 70. The method of Example 68 or 69, wherein the set of appliance design parameters comprise one or more of the following: a minimum force magnitude, a maximum force magnitude, a minimum torque magnitude, a maximum torque magnitude, a permissible force direction, an impermissible force direction, a permissible torque direction, or an impermissible torque direction.

Example 71. A system comprising:
one or more processors; and
a memory operably coupled to the one or more processors and storing instructions that, when executed by the processor, cause the system to perform operations comprising:
receiving a treatment plan for a patient's teeth, the treatment plan comprising a target arrangement for the teeth and a plurality of treatment stages configured to reposition the teeth from an initial arrangement toward the target arrangement,
identifying a set of appliance design parameters for a dental appliance configured to implement at least one treatment stage of the plurality of treatment stages, wherein the set of appliance design parameters comprises one or more manufacturability parameters corresponding to an additive manufacturing process to be used to directly fabricate the dental appliance, and
determining an appliance geometry for the dental appliance using the set of appliance design parameters.

Example 72. The system of Example 71, wherein the plurality of treatment stages comprise a plurality of intermediate arrangements for the teeth, and the dental appliance is configured to reposition the teeth to at least one intermediate arrangement of the plurality of intermediate arrangements.

Example 73. The system of Example 71 or 72, wherein the dental appliance comprises an aligner.

Example 74. The system of any one of Examples 71 to 73, wherein the appliance geometry comprises a thickness map of the dental appliance.

Example 75. The system of any one of Examples 71 to 74, wherein the one or more manufacturability parameters comprise at least one constraint on the appliance geometry that is configured to improve manufacturability of the dental appliance.

Example 76. The system of Example 75, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

Example 77. The system of Example 75 or 76, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

Example 78. The system of any one of Examples 71 to 77, wherein the one or more manufacturability parameters comprise at least one adjustment to the appliance geometry that is configured to improve manufacturability of the dental appliance.

Example 79. The system of Example 78, wherein the at least one adjustment comprises one or more of the following: increasing a feature size, decreasing a feature size, changing a feature location, increasing an appliance thickness, decreasing an appliance thickness, changing an appliance orientation, or adding a support structure.

Example 80. The system of Example 78 or 79, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the dental appliance, or an expected change in a property of the dental appliance after the post-processing technique is used.

Example 81. The system of any one of Examples 71 to 80, wherein the set of appliance design parameters comprise one or more efficacy parameters representing correspondences between appliance features and clinical goals.

Example 82. The system of Example 81, wherein:

the appliance features comprise one or more of the following: appliance thickness, appliance stiffness, surface geometry, feature type, feature size, feature shape, surface geometry attachment location, attachment geometry, or contact points, and the clinical goals comprise one or more of the following: a tooth to be moved, a tooth movement type, a tooth movement direction, a tooth movement amount, a tooth movement velocity, a magnitude of a force to be applied to a tooth, a magnitude of a torque to be applied to a tooth, a direction of a force to be applied to a tooth, or a direction of a torque to be applied to a tooth.

Example 83. The system of any one of Examples 71 to 82, wherein the appliance geometry is determined using a rule-based algorithm, and wherein the rule-based algorithm implements a set of appliance design rules corresponding to the set of appliance design parameters.

Example 84. The system of Example 83, wherein the operations further comprise determining the set of appliance design rules based on the set of appliance design parameters.

Example 85. The system of Example 83 or 84, wherein the set of appliance design rules comprise rules related to one or more of the following: a minimum feature size, a maximum force threshold, permitted movement types, forbidden movement types, permitted geometries, forbidden geometries, a minimum thickness, or a maximum thickness.

Example 86. The system of any one of Examples 71 to 85, wherein the operations further comprise performing a quality check of the appliance geometry.

Example 87. The system of Example 86, wherein performing the quality check of the appliance geometry comprises evaluating whether the appliance geometry exhibits any manufacturability issues.

Example 88. The system of Example 87, wherein the manufacturability issues comprise one or more of the following: self-intersecting regions, discontinuities, holes, spikes, or artifacts.

Example 89. The system of any one of Examples 86 to 88, wherein performing the quality check of the appliance geometry comprises evaluating whether the appliance geometry complies with safety constraints.

Example 90. The system of Example 89, wherein the safety constraints comprise one or more of the following: a thickness limit, a stiffness limit, or a force limit.

Example 91. The system of any one of Examples 86 to 90, wherein the operations further comprise: if the appliance geometry does not pass the quality check, determining whether one or more of the appliance geometry, the set of appliance design parameters, or the treatment plan can be modified.

Example 92. The system of Example 91, wherein the operations further comprise: if the appliance geometry can be modified, modifying the appliance geometry, and performing a quality check of the modified appliance geometry.

Example 93. The system of Example 91 or 92, wherein the operations further comprise:

if at least one appliance design parameter of the set of appliance design parameters can be modified, modifying the at least one appliance design parameter, determining a modified appliance geometry using the modified at least one design parameter, and performing a quality check of the modified appliance geometry.

Example 94. The system of Example 93, wherein modifying the at least one design parameter comprises relaxing or omitting a constraint on the appliance geometry.

Example 95. The system of any one of Examples 91 to 94, wherein the operations further comprise:

if the treatment plan can be modified, modifying the treatment plan, determining a modified appliance geometry based on the modified treatment plan, and performing a quality check of the modified appliance geometry.

Example 96. The system of Example 95, wherein modifying the treatment plan comprises modifying one or more of: a tooth position, a direction of tooth movement, an amount of tooth movement, a direction of a force applied to a tooth, a magnitude of a force applied to a tooth, a number of treatment stages, or an attachment to be applied to a tooth.

Example 97. The system of any one of Examples 86 to 96, wherein the operations further comprise: if the appliance geometry does not pass the quality check after a predetermined number of iterations, generating instructions for indirect fabrication of the dental appliance via a thermoforming process.

Example 98. The system of any one of Examples 86 to 97, wherein the operations further comprise: if the appliance geometry passes the quality check, generating instructions for direct fabrication of the dental appliance having the appliance geometry via the additive manufacturing process.

Example 99. The system of any one of Examples 71 to 98, wherein the operations further comprise identifying a force system configured to produce at least one tooth movement according to the at least one treatment stage, wherein the appliance geometry is determined based at least in part on the force system.

Example 100. The system of Example 99, wherein the appliance geometry is configured to deliver the force system to the teeth.

Example 101. The system of Example 99 or 100, wherein the set of appliance design parameters comprise one or more of the following: a minimum force magnitude, a maximum force magnitude, a minimum torque magnitude, a maximum torque magnitude, a permissible force direction, an impermissible force direction, a permissible torque direction, or an impermissible torque direction.

Example 102. A system comprising:

one or more processors; and a memory operably coupled to the one or more processors and storing instructions that, when executed by the processor, cause the system to perform operations comprising:

receiving a treatment plan for a patient's teeth, the treatment plan comprising a target arrangement for the teeth and a plurality of treatment stages configured to reposition the teeth from an initial arrangement toward the target arrangement, identifying a set of appliance design parameters for a plurality of appliances configured to implement the plurality of treatment stages of the treatment plan, determining a set of appliance design rules for designing the plurality of appliances, based on the one or more appliance design parameters, and generating at least one appliance geometry for at least one appliance of the plurality of appliances, using the one or more appliance design rules.

Example 103. The system of Example 102, wherein the one or more appliance design parameters comprise one or more of the following: tooth positions, tooth shapes, movement directions, movement velocities, force vectors, appliance features, attachments, or contact points.

Example 104. The system of Example 102 or 103, wherein the one or more appliance design rules include at least one constraint associated with an additive manufacturing process.

Example 105. The system of Example 104, wherein the one or more appliance design rules comprise rules related to one or more of the following: a minimum feature size, a maximum force threshold, permitted movement types, forbidden movement types, permitted geometries, forbidden geometries, a minimum thickness, or a maximum thickness.

Example 106. The system of any one of Examples 102 to 105, wherein the at least one appliance geometry is generated using a rule-based algorithm that implements the one or more appliance design rules.

Example 107. The system of any one of Examples 102 to 106, wherein the operations further comprise performing a quality check of the appliance geometry.

Example 108. The system of Example 107, wherein performing the quality check comprises determining whether the at least one appliance geometry is manufacturable via a direct fabrication process.

Example 109. The system of Example 108, wherein the direct fabrication process comprises an additive manufacturing process.

Example 110. The system of Example 108 or 109, wherein if the at least one appliance geometry is determined not to be manufacturable via the direct fabrication process, the operations further comprise:

modifying the treatment plan, and generating at least one revised appliance geometry based at least in part on the modified treatment plan.

Example 111. The system of any one of Examples 108 to 110, wherein if the at least one appliance geometry is determined not to be manufacturable via the direct fabrication process, the operations further comprise:

modifying the one or more appliance design parameters, and generating at least one revised appliance geometry based at least in part on the modified one or more appliance design parameters.

Example 112. The system of any one of Examples 108 to 111, wherein if the at least one appliance geometry is determined not to be manufacturable via the direct fabrication process, the operations further comprise:

modifying the one or more appliance design rules, and generating at least one revised appliance geometry based at least in part on the modified one or more appliance design rules.

Example 113. The system of any one of Examples 108 to 112, wherein if the at least one appliance geometry is determined not be manufacturable after a predetermined number of iterations, the operations further comprise generating instructions for fabricating the at least appliance via an indirect fabrication process.

Example 114. The system of any one of Examples 102 to 113, wherein the operations further comprise generating instructions configured to cause a manufacturing system to fabricate the at least one appliance using a direct fabrication technique.

Example 115. The system of any one of Examples 102 to 114, wherein the operations further comprise identifying a force system configured to produce at least one tooth movement according to at least one treatment stage, wherein the at least one appliance geometry is generated based at least in part on the force system.

Example 116. The system of Example 115, wherein the appliance geometry is configured to deliver the force system to the teeth.

Example 117. The system of Example 115 or 116, wherein the set of appliance design parameters comprise one or more of the following: a minimum force magnitude, a maximum force magnitude, a minimum torque magnitude, a maximum torque magnitude, a permissible force direction, an impermissible force direction, a permissible torque direction, or an impermissible torque direction.

Example 118. A non-transitory computer-readable storage medium comprising instructions that, when executed by one or more processors of a computing system, cause the computing system to perform operations comprising the method of any one of Examples 1 to 13 or 24 to 70.

CONCLUSION

Although many of the embodiments are described above with respect to systems, devices, and methods for manufacturing dental appliances, the technology is applicable to other applications and/or other approaches, such as manufacturing other types of objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-11.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method comprising:
   receiving a treatment plan for a patient's teeth, the treatment plan specifying a target arrangement for the teeth and a plurality of treatment stages to reposition the teeth from an initial arrangement toward the target arrangement;
   identifying one or more manufacturability parameters for one or more dental appliances to implement the treatment plan, wherein the one or more manufacturability parameters correspond to an additive manufacturing process to be used to directly fabricate the one or more dental appliances;
   determining an appliance geometry for the one or more dental appliances based on the one or more manufacturability parameters,
      wherein the one or more manufacturability parameters comprise at least one constraint on the appliance geometry that is configured to improve feasibility of directly fabricating the one or more dental appliances via the additive manufacturing process, improve accuracy of the one or more dental appliances when directly fabricated via the additive manufacturing process, or a combination thereof, and
      wherein the determined appliance geometry complies with the at least one constraint; and
   generating instructions for fabricating the one or more dental appliances with the determined appliance geometry using the additive manufacturing process.

2. The method of claim 1, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

3. The method of claim 1, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

4. The method of claim 1, wherein the one or more manufacturability parameters comprise at least one adjustment to the appliance geometry that is configured to improve the feasibility of directly fabricating the one or more dental appliances via the additive manufacturing process, improve the accuracy of the one or more dental appliances when directly fabricated via the additive manufacturing process, or a combination thereof.

5. The method of claim 4, wherein the at least one adjustment comprises one or more of the following: increasing a feature size, decreasing a feature size, changing a feature location, increasing an appliance thickness, decreasing an appliance thickness, changing an appliance orientation, or adding a support structure.

6. The method of claim 4, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the one or more dental appliances, or an expected change in a property of the one or more dental appliances after the post-processing technique is used.

7. The method of claim 1, further comprising performing a quality check of the appliance geometry, wherein the quality check comprises evaluating whether the appliance geometry exhibits one or more manufacturability issues.

8. The method of claim 1, further comprising performing a quality check of the appliance geometry, wherein the quality check comprises evaluating whether the appliance geometry complies with one or more safety constraints.

9. The method of claim 1, wherein the one or more dental appliances comprise an aligner, a palatal expander, an attachment placement template, or a retainer.

10. The method of claim 1, further comprising fabricating the one or more dental appliances with the determined appliance geometry using the additive manufacturing process.

11. The method of claim 10, wherein the receiving, identifying, determining, and generating are performed by one or more processors.

12. The method of claim 11, wherein the fabricating is performed by a device different from the one or more processors.

13. The method of claim 1, wherein the additive manufacturing process comprises applying energy to a precursor material to build up the one or more dental appliances in a layer-by-layer manner.

14. The method of claim 1, wherein the additive manufacturing process comprises stereolithography, digital light processing, or selective laser sintering.

15. A system comprising:

one or more processors; and a memory operably coupled to the one or more processors and storing instructions that, when executed by the one or more processors, cause the system to perform operations comprising:

receiving a treatment plan for a patient's teeth, the treatment plan specifying a target arrangement for the teeth and a plurality of treatment stages to reposition the teeth from an initial arrangement toward the target arrangement, identifying one or more manufacturability parameters for one or more dental appliances to implement the treatment plan, wherein the one or more manufacturability parameters correspond to an additive manufacturing process to be used to directly fabricate the one or more dental appliances, determining an appliance geometry for the one or more dental appliances based on the one or more manufacturability parameters, wherein the one or more manufacturability parameters comprise at least one constraint on the appliance geometry that is configured to improve feasibility of directly fabricating the one or more dental appliances via the additive manufacturing process, improve accuracy of the one or more dental appliances when directly fabricated via the additive manufacturing process, or a combination thereof, and wherein the determined appliance geometry complies with the at least one constraint, and generating instructions for fabricating the one or more dental appliances with the determined appliance geometries using the additive manufacturing process.

16. The system of claim 15, wherein the at least one constraint on the appliance geometry comprises one or more of the following: a minimum feature size, a maximum feature size, a minimum appliance thickness, a maximum appliance thickness, a maximum overhang size, a maximum overhang angle, or a maximum bridge size.

17. The system of claim 15, wherein the at least one constraint is based on one or more of the following: a resolution of the additive manufacturing process, a property of a material used in the additive manufacturing process, an overhang size limit of the additive manufacturing process, an overhang angle limit of the additive manufacturing process, a bridge size limit of the additive manufacturing process, or a post-processing condition.

18. The system of claim 15, wherein the one or more manufacturability parameters comprise at least one adjustment to the appliance geometry that is configured to improve the feasibility of directly fabricating the one or more dental appliances via the additive manufacturing process, improve the accuracy of the one or more dental appliances when directly fabricated via the additive manufacturing process, or a combination thereof.

19. The system of claim 18, wherein the at least one adjustment comprises one or more of the following: increasing a feature size, decreasing a feature size, changing a feature location, increasing an appliance thickness, decreasing an appliance thickness, changing an appliance orientation, or adding a support structure.

20. The system of claim 18, wherein the at least one adjustment is based on one or more of the following: a directional bias of the additive manufacturing process, a resolution of the additive manufacturing process, an expected amount of overcuring, an expected amount of material shrinkage, an expected amount of material expansion, a post-processing technique to be used with the one or more dental appliances, or an expected change in a property of the one or more dental appliances after the post-processing technique is used.

21. The system of claim 15, wherein the operations further comprise performing a quality check of the appliance geometry, and wherein the quality check comprises evaluating whether the appliance geometry exhibits one or more manufacturability issues.

22. The system of claim 15, wherein the operations further comprise performing a quality check of the appliance geometry, and wherein the quality check comprises evaluating whether the appliance geometry complies with one or more safety constraints.

23. The system of claim 15, wherein the one or more dental appliances comprise an aligner, a palatal expander, an attachment placement template, or a retainer.

* * * * *